(12) United States Patent
Shimura et al.

(10) Patent No.: US 8,154,688 B2
(45) Date of Patent: Apr. 10, 2012

(54) PLANAR LIGHT-EMITTING DEVICE AND LIQUID CRYSTAL DISPLAY APPARATUS

(75) Inventors: Takashi Shimura, Yamanashi-ken (JP); Taku Kumasaka, Tsuru (JP)

(73) Assignee: Citizen Electronics Co., Ltd., Yamanashi-ken (JP)

( * ) Notice: Subject to any disclaimer, the term of this patent is extended or adjusted under 35 U.S.C. 154(b) by 435 days.

(21) Appl. No.: 12/471,704

(22) Filed: May 26, 2009

(65) Prior Publication Data

US 2009/0290093 A1 Nov. 26, 2009

(30) Foreign Application Priority Data

May 26, 2008 (JP) .............................. JP2008-137153
Oct. 22, 2008 (JP) .............................. JP2008-272536
Oct. 22, 2008 (JP) .............................. JP2008-272537
Oct. 28, 2008 (JP) .............................. JP2008-276231

(51) Int. Cl.
  *G02F 1/1335* (2006.01)
(52) U.S. Cl. ................ 349/65; 349/56; 349/61; 349/62; 349/63; 349/69
(58) Field of Classification Search .............. 349/56, 349/61, 62, 63, 65, 69, 70
See application file for complete search history.

(56) References Cited

U.S. PATENT DOCUMENTS

| 7,560,745 B2* | 7/2009 | Kim et al. ................. 257/98 |
| 2009/0073683 A1* | 3/2009 | Chen et al. ................. 362/224 |
| 2010/0073903 A1* | 3/2010 | Yun et al. ................. 362/97.1 |
| 2011/0115696 A1* | 5/2011 | Pankaj et al. ................. 345/102 |

FOREIGN PATENT DOCUMENTS

| JP | 9-186825 | 7/1997 |
| JP | 2005-228718 | 8/2005 |
| JP | 2006-164625 | 6/2006 |
| JP | 2008-34372 | 2/2008 |

* cited by examiner

*Primary Examiner* — Jennifer Doan
(74) *Attorney, Agent, or Firm* — Wenderoth, Lind & Ponack, L.L.P.

(57) ABSTRACT

A planar light-emitting device has a plurality of light-emitting units each including a light source and a lightguide plate. The light-emitting units are arranged with the light-exiting surfaces of their respective lightguide plates being substantially flush with each other. Each lightguide plate has an upper surface as a light-exiting surface, a lower surface opposite to the light-exiting surface, and a peripheral side surface extending between the respective peripheral edges of the upper and lower surfaces. The lightguide plate emits light received from the light source from the light-exiting surface. At least a part of the peripheral side surface is an inclined surface inclined relative to the light-exiting surface.

20 Claims, 16 Drawing Sheets

[Fig. 1]
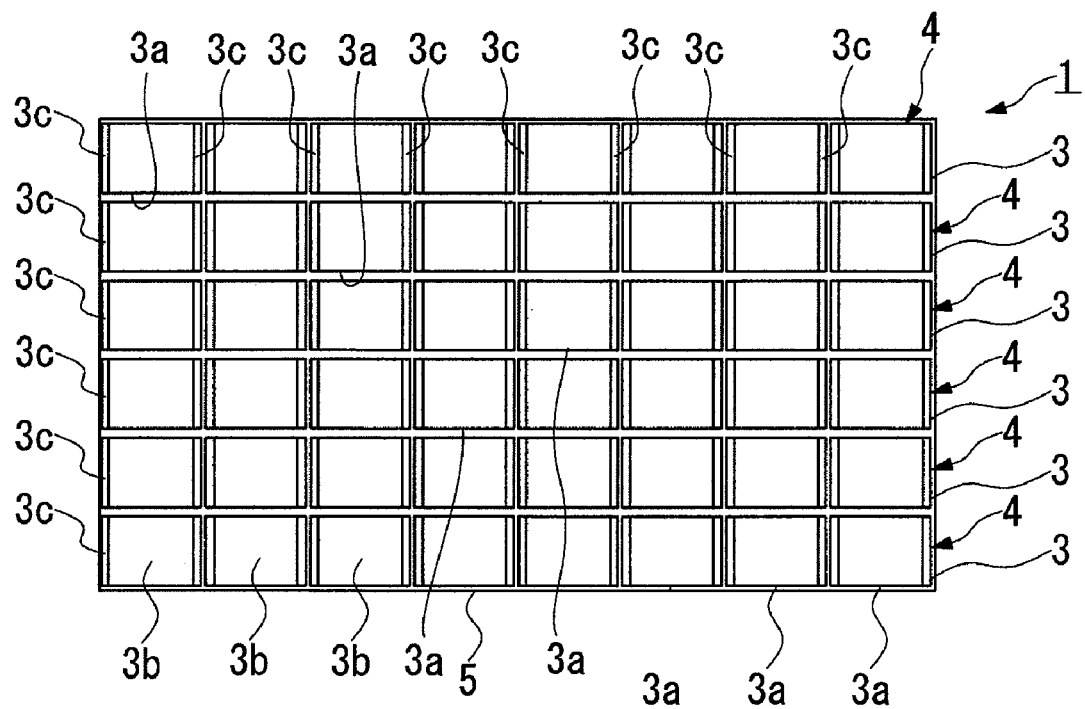
[Fig. 2]
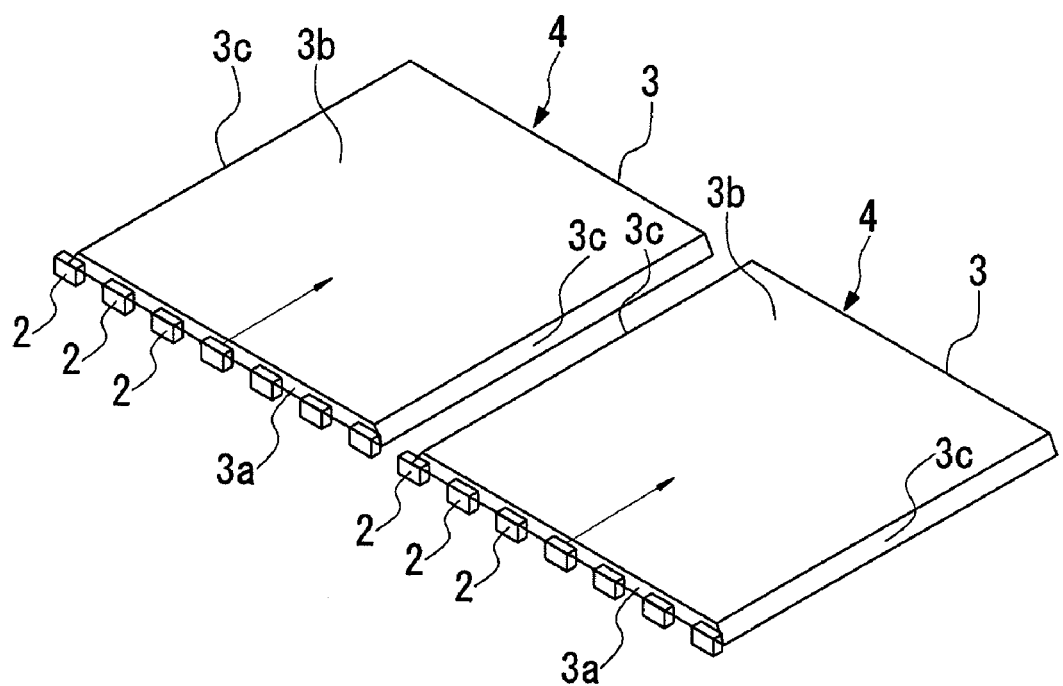

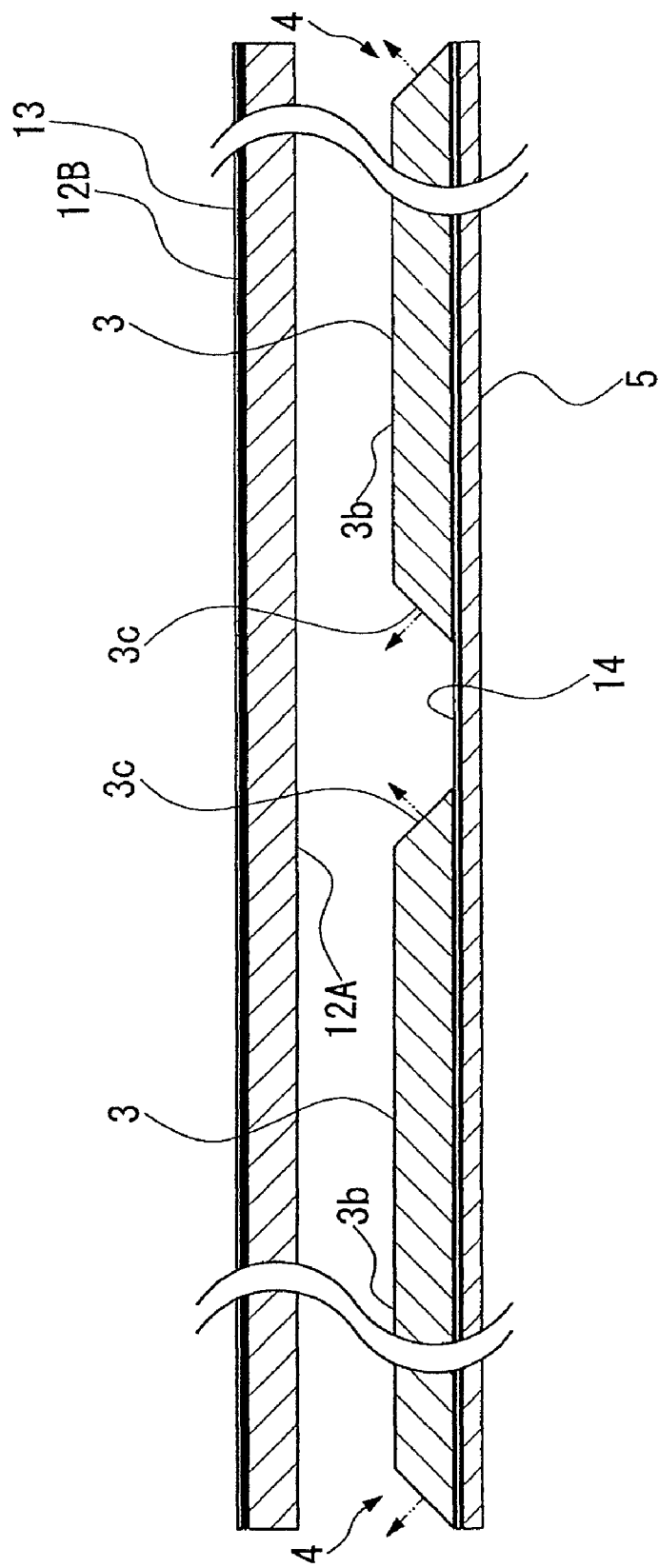
[Fig. 3]

[Fig. 4]
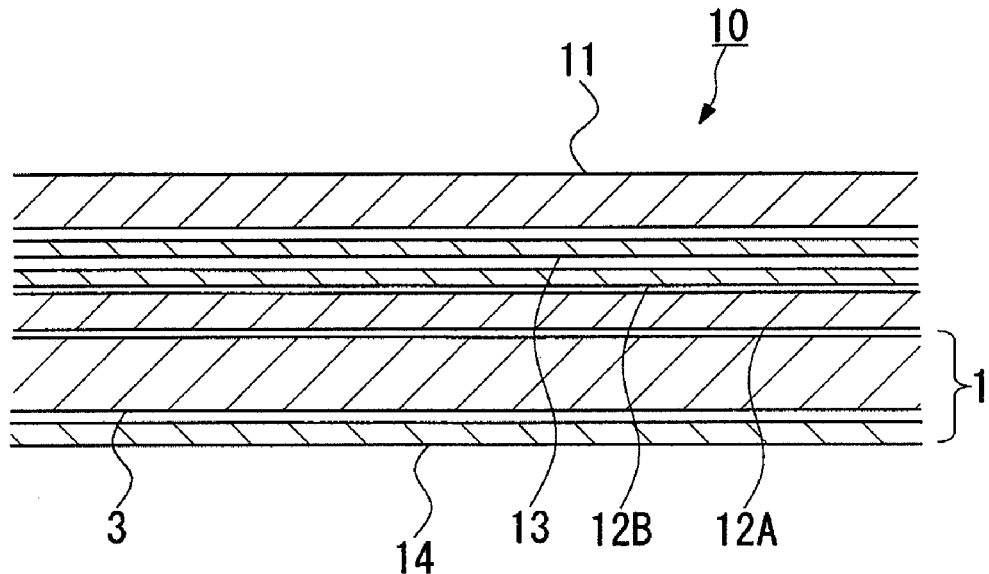
[Fig. 5]
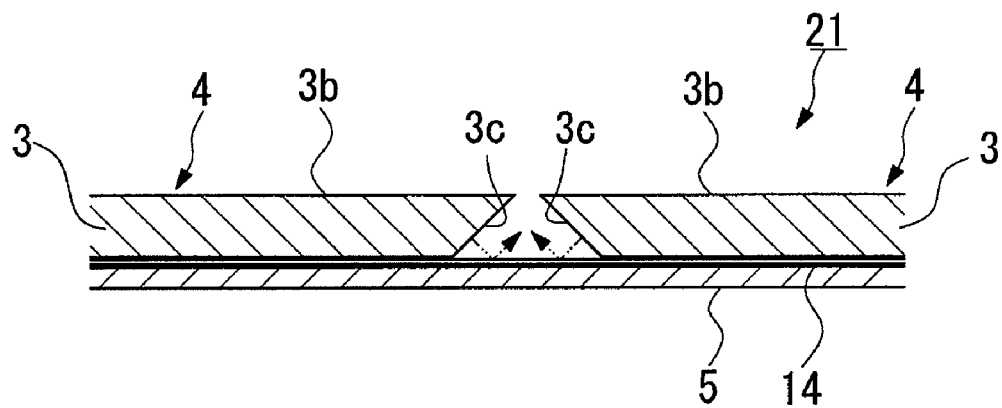
[Fig. 6]
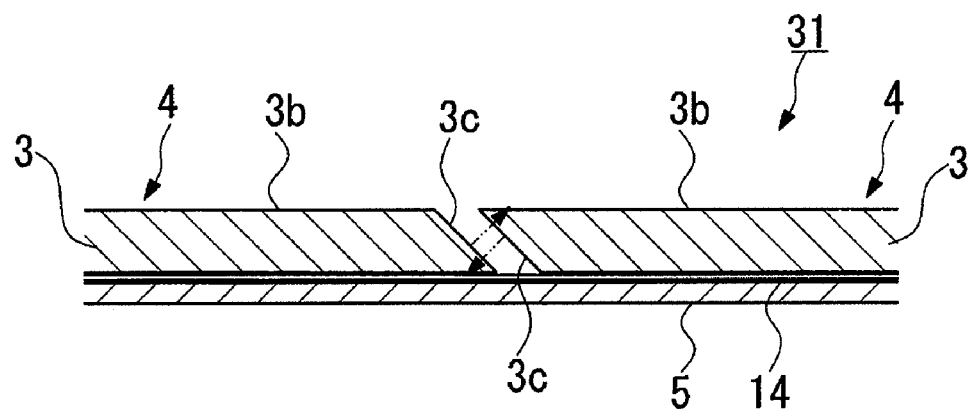

[Fig. 7]
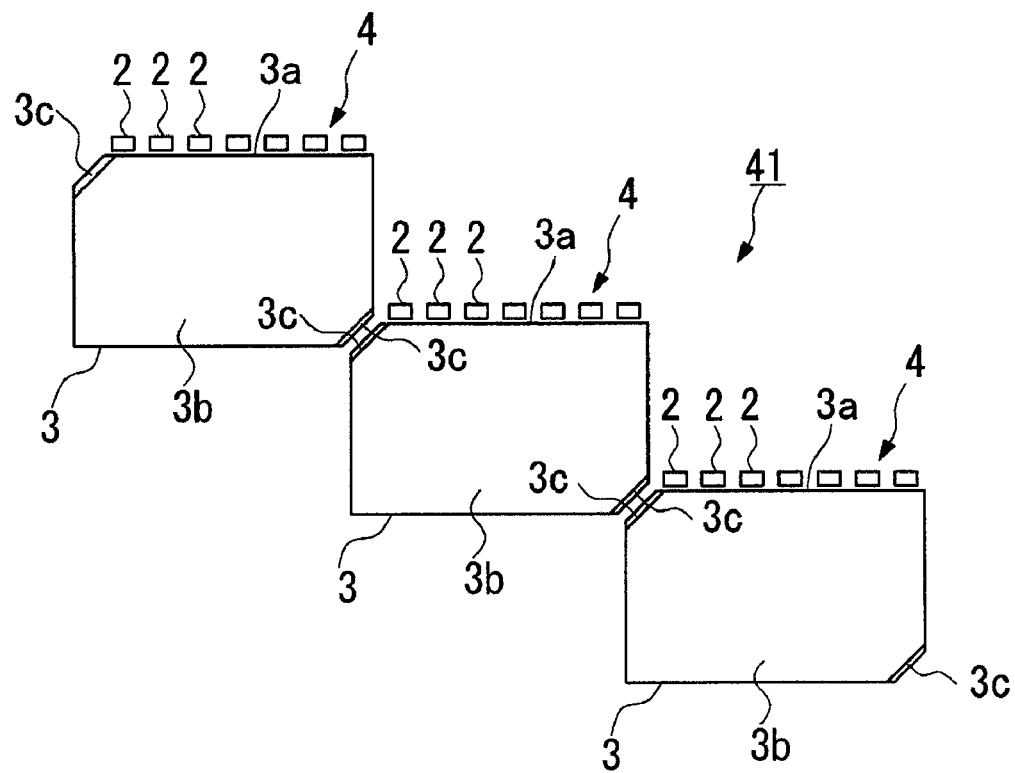
[Fig. 8]
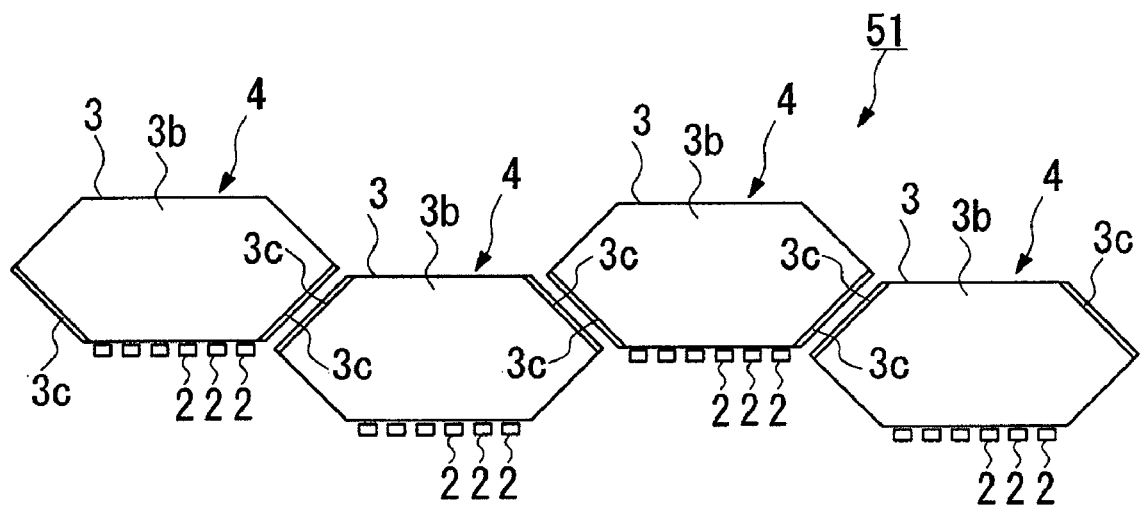

[Fig. 9]
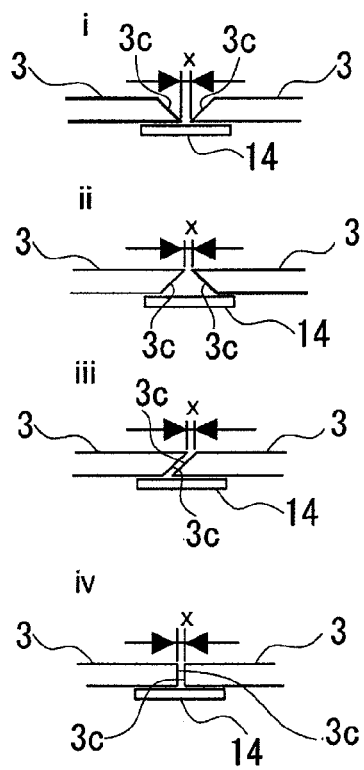
[Fig. 10]
|  | 0mm | 1mm | 2mm |
|---|---|---|---|
| i |  |  |  |
| ii |  |  |  |
| iii |  |  |  |
| iv |  |  |  |

[Fig. 11]
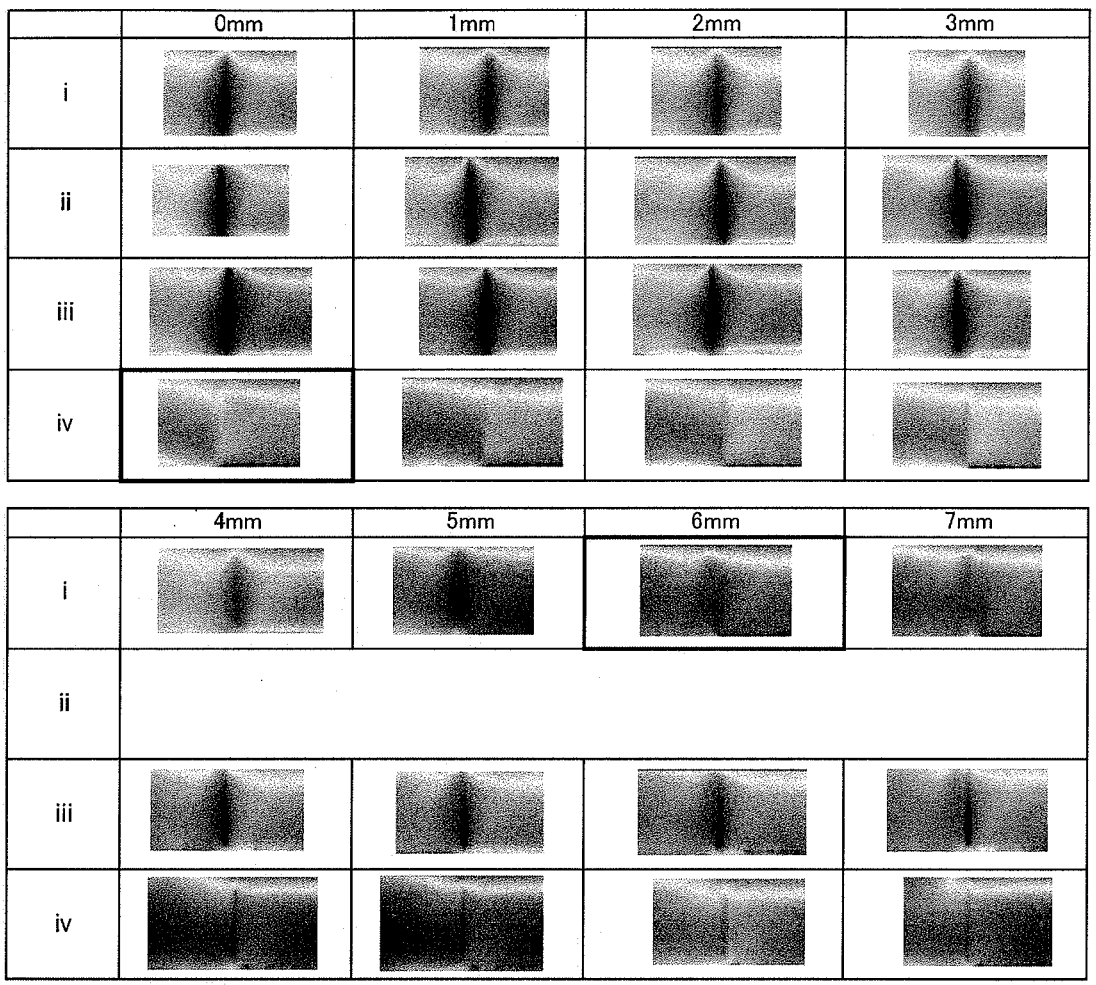
[Fig. 12]
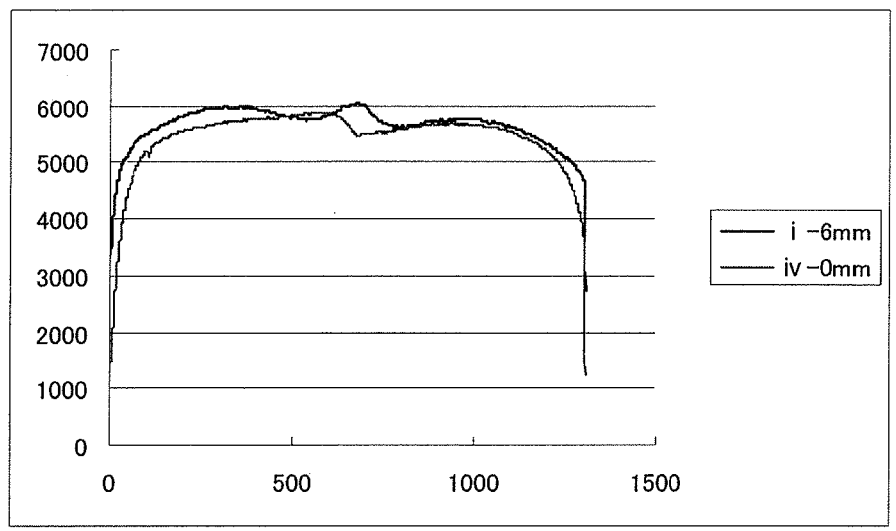

[Fig. 13]
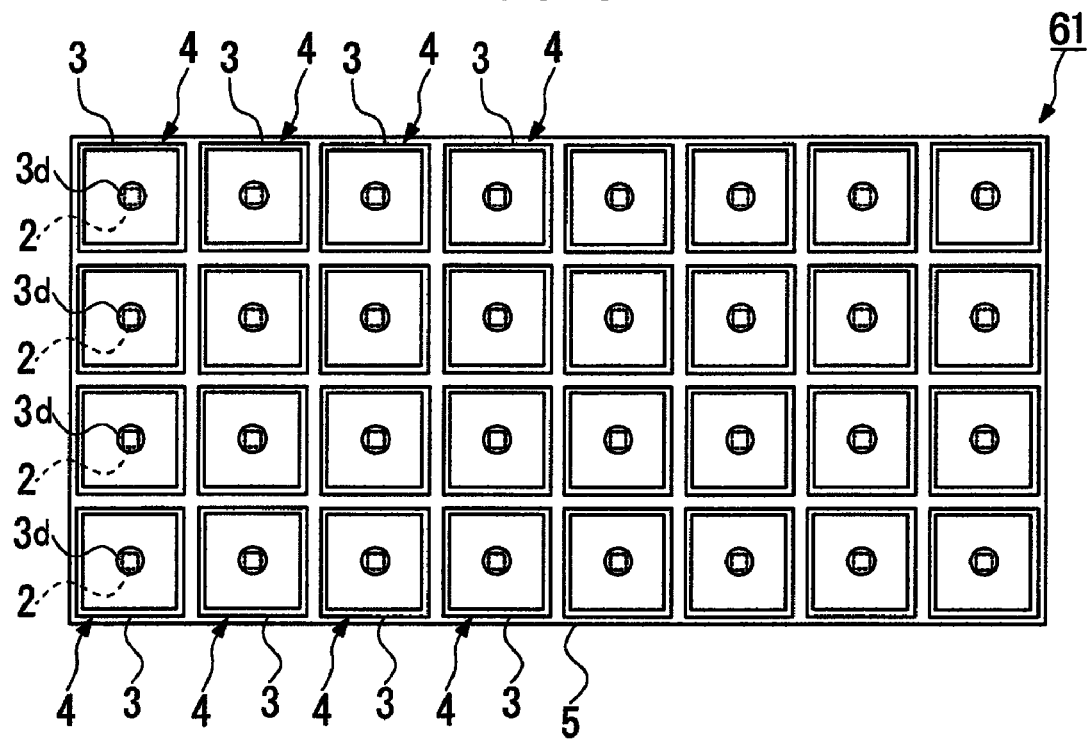
[Fig. 14]
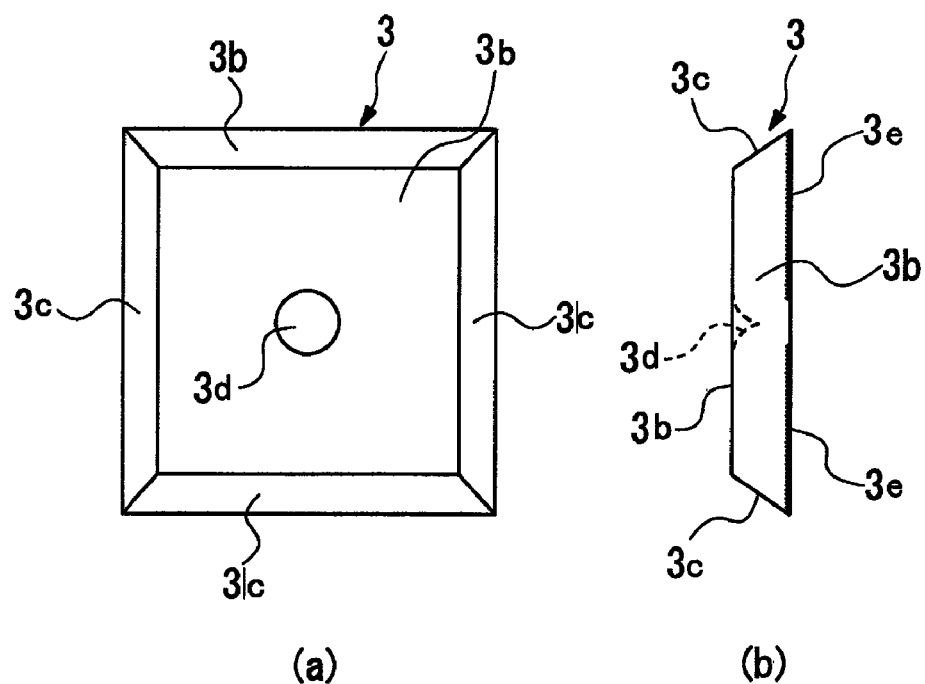
(a)          (b)

[Fig. 15]
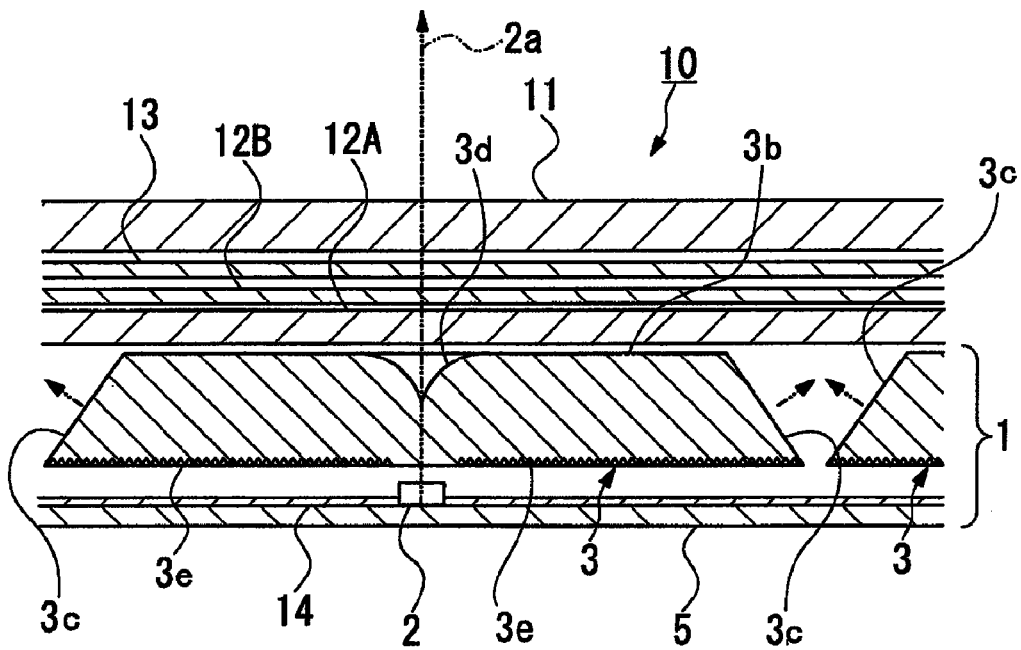
[Fig. 16]
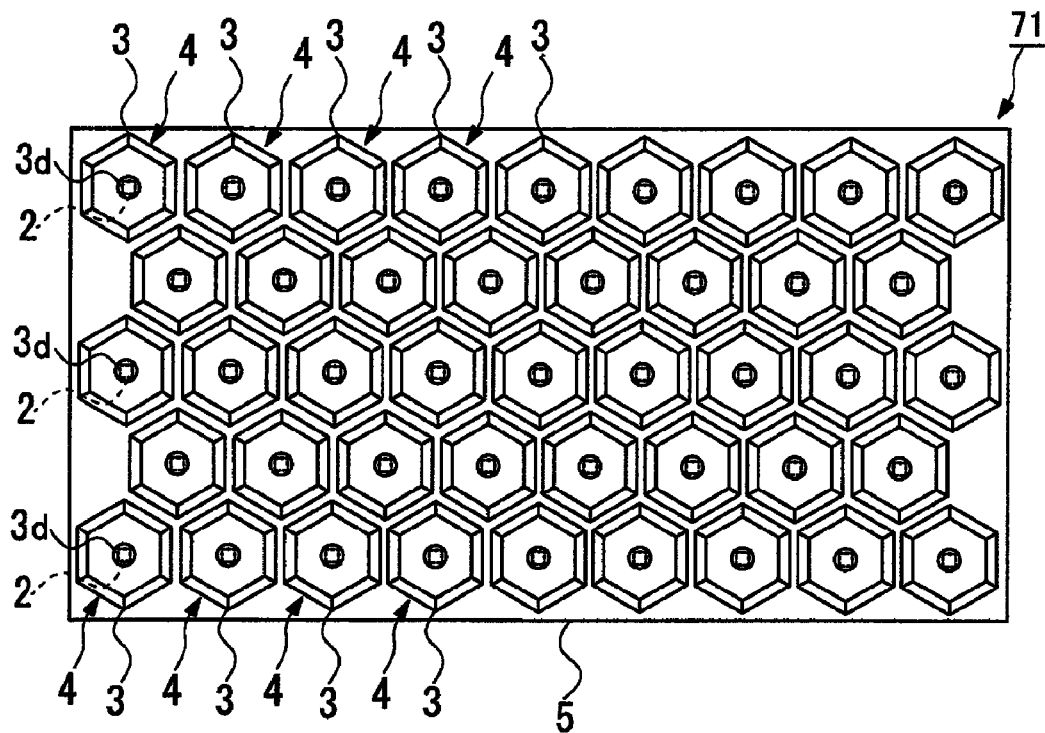

[Fig. 17]
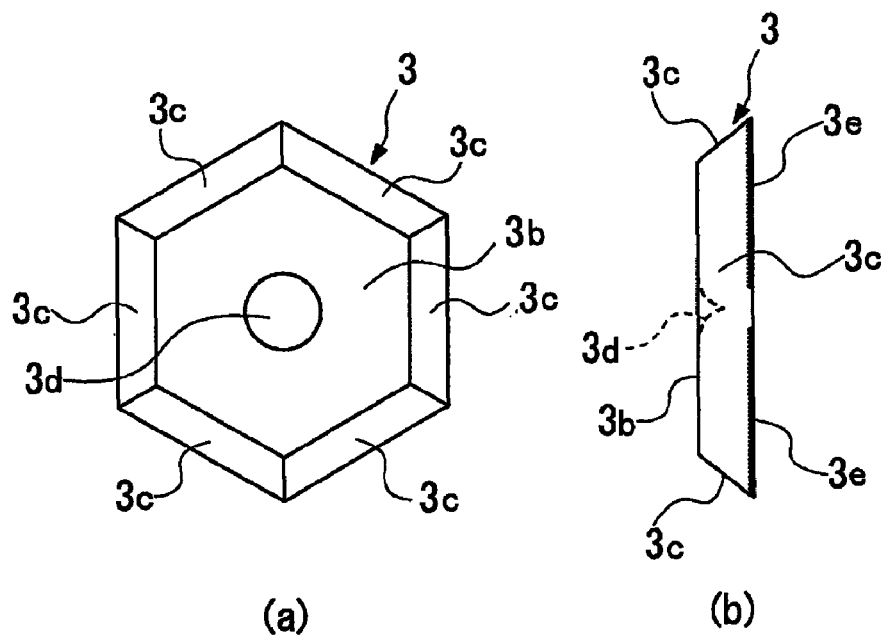
(a)　　　　　　　　　　(b)
[Fig. 18]
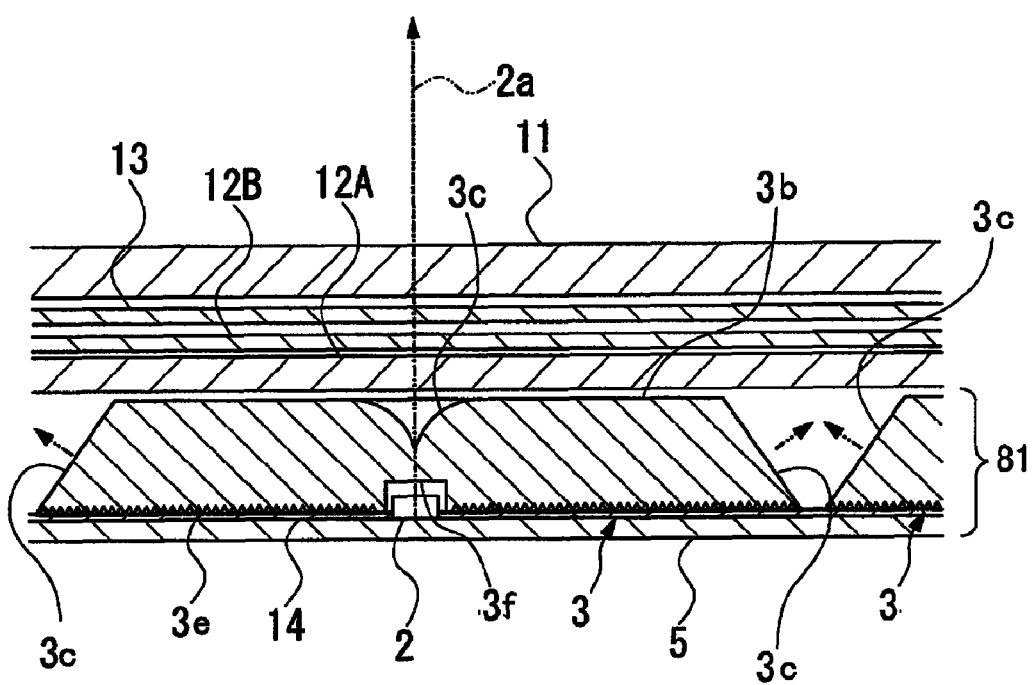

[Fig. 19]
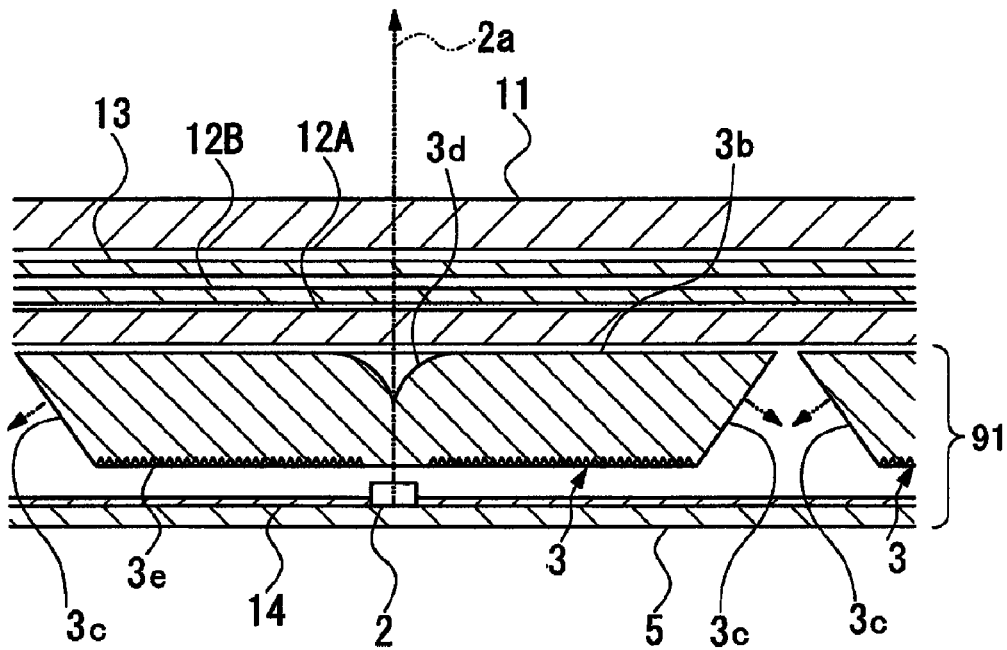
[Fig. 20]
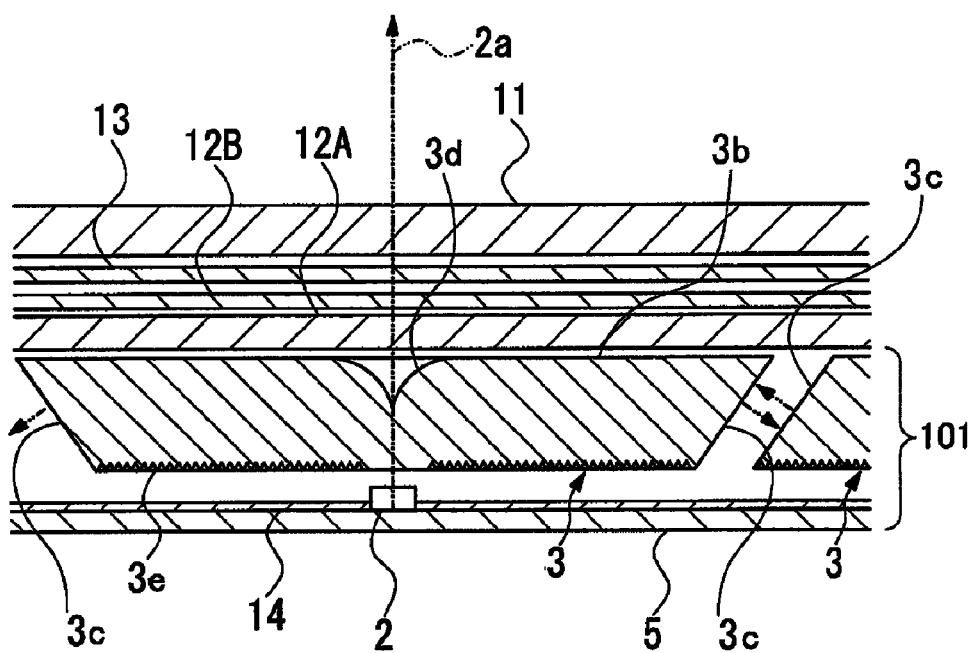

[Fig. 21]
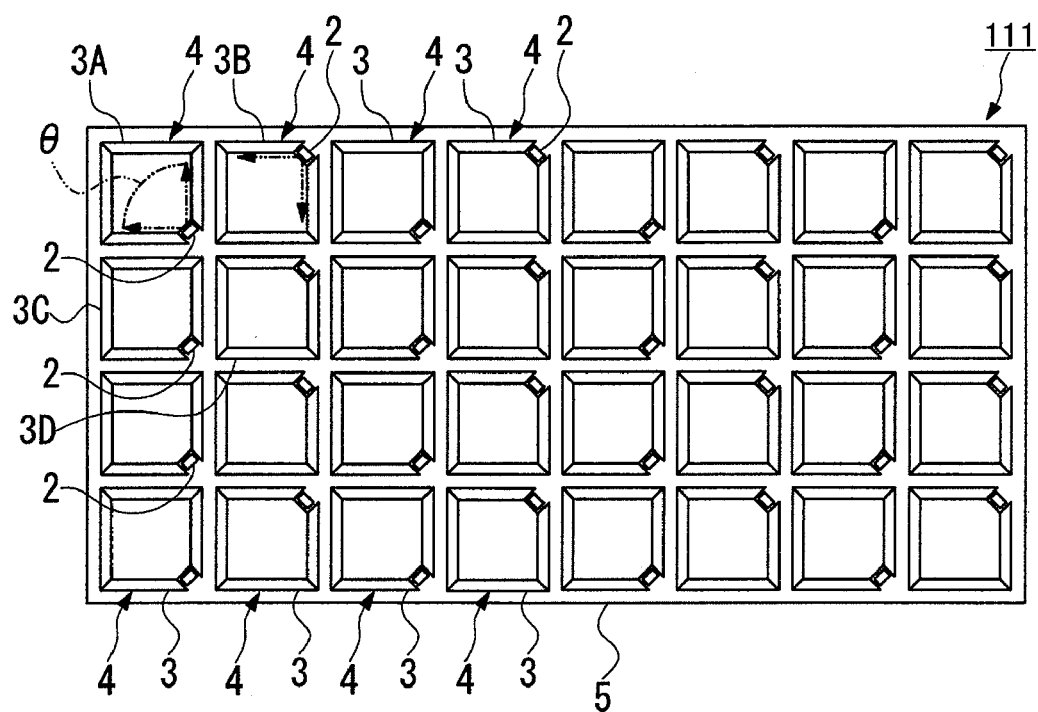
[Fig. 22]
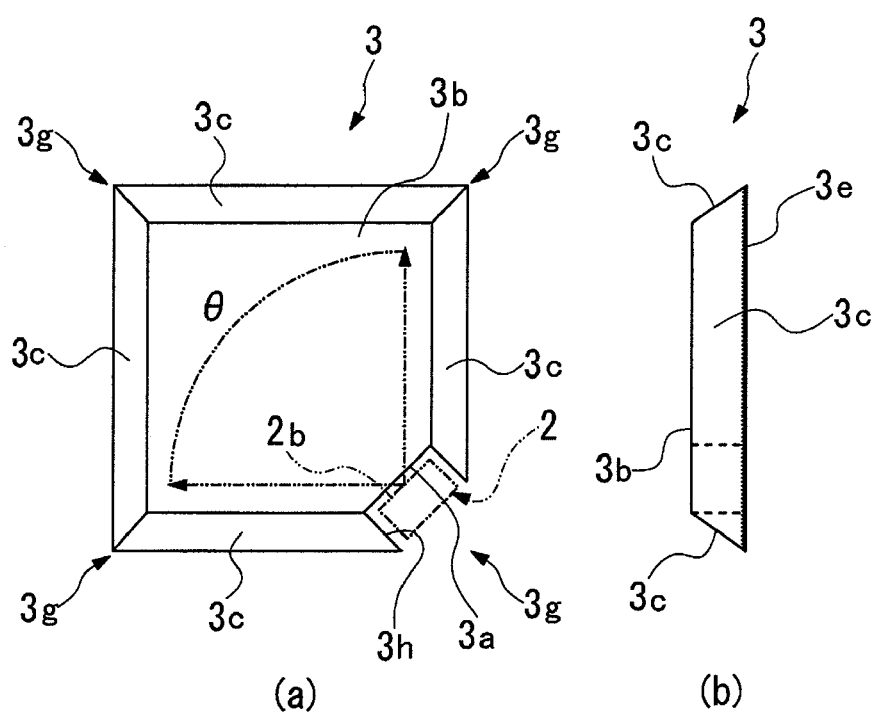
(a)　　　　　　　(b)

[Fig. 23]
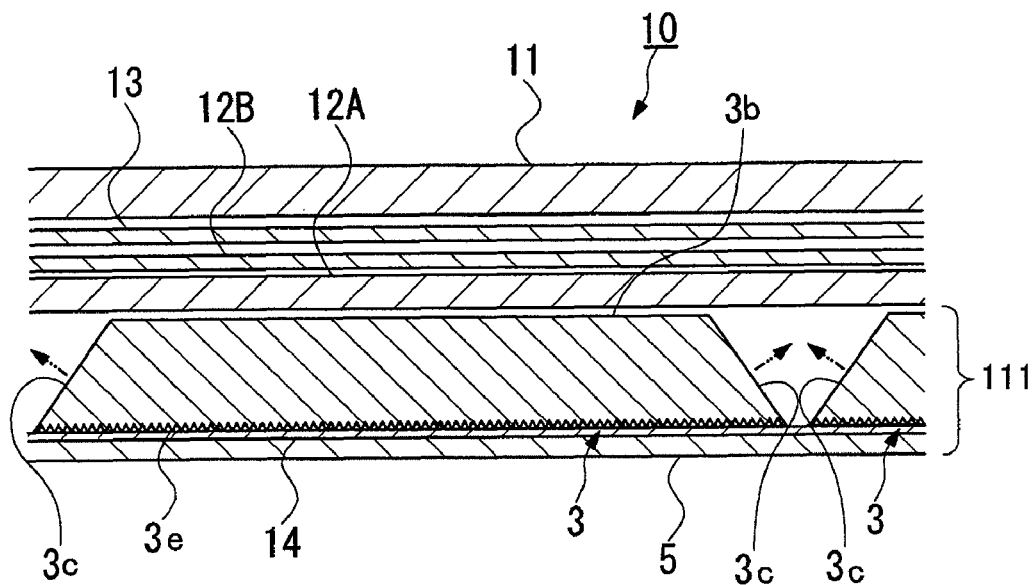
[Fig. 24]
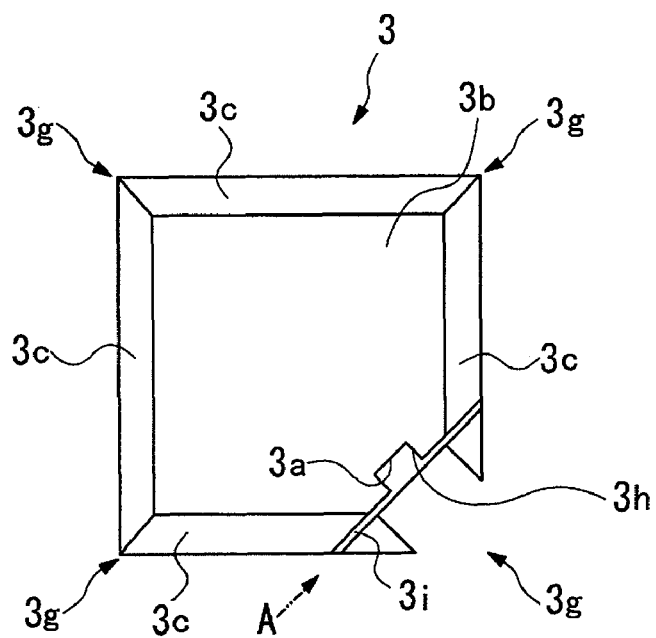

[Fig. 25]
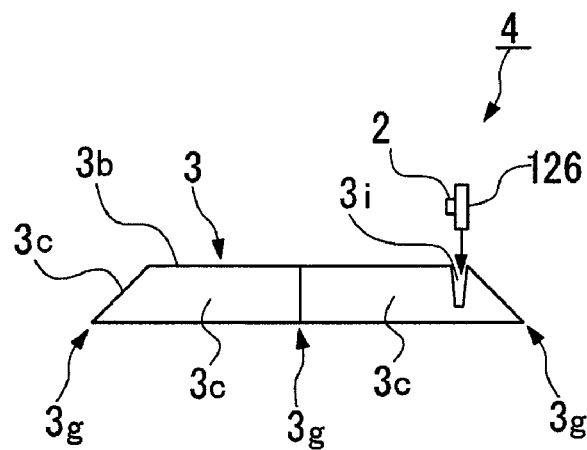
[Fig. 26]
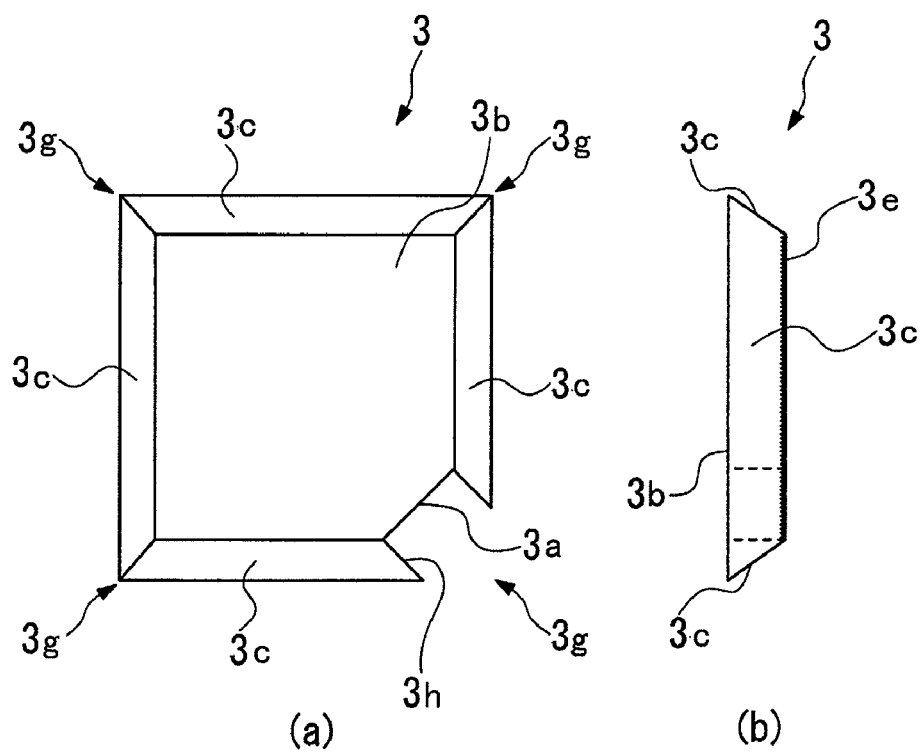
(a)                    (b)

[Fig. 27]
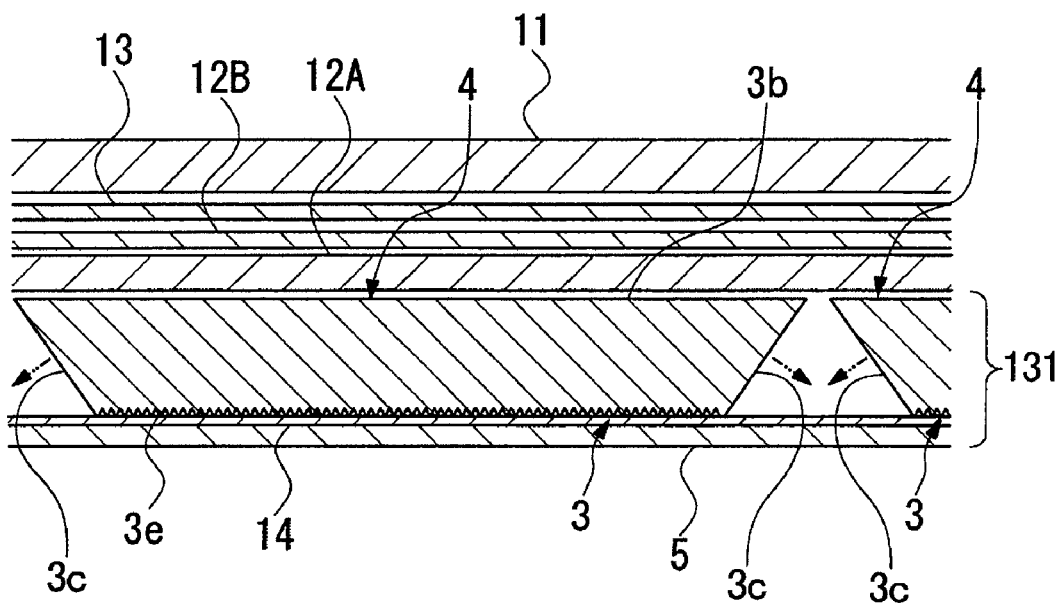
[Fig. 28]
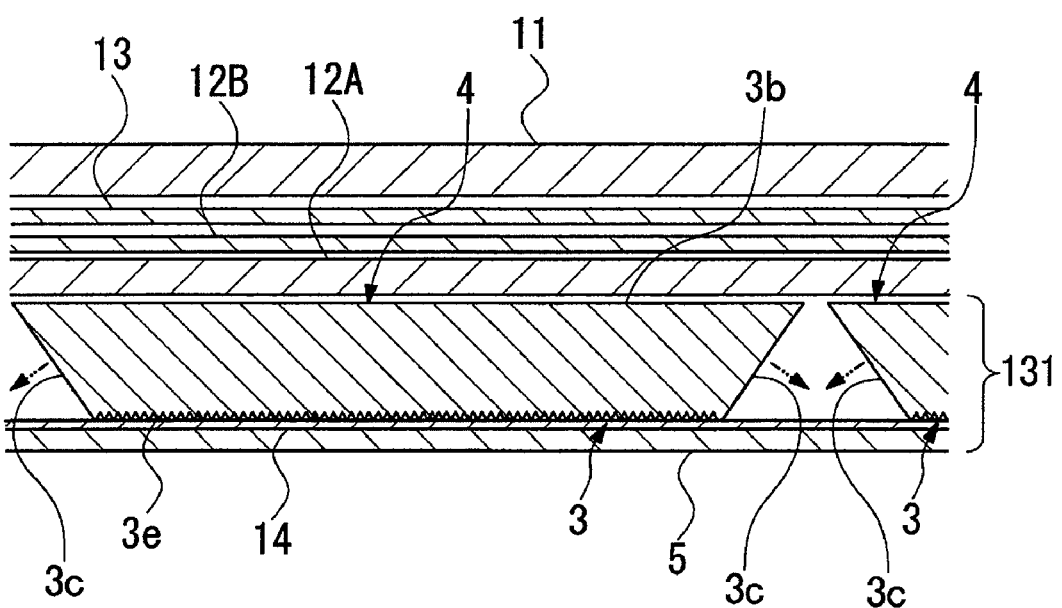

[Fig. 29]
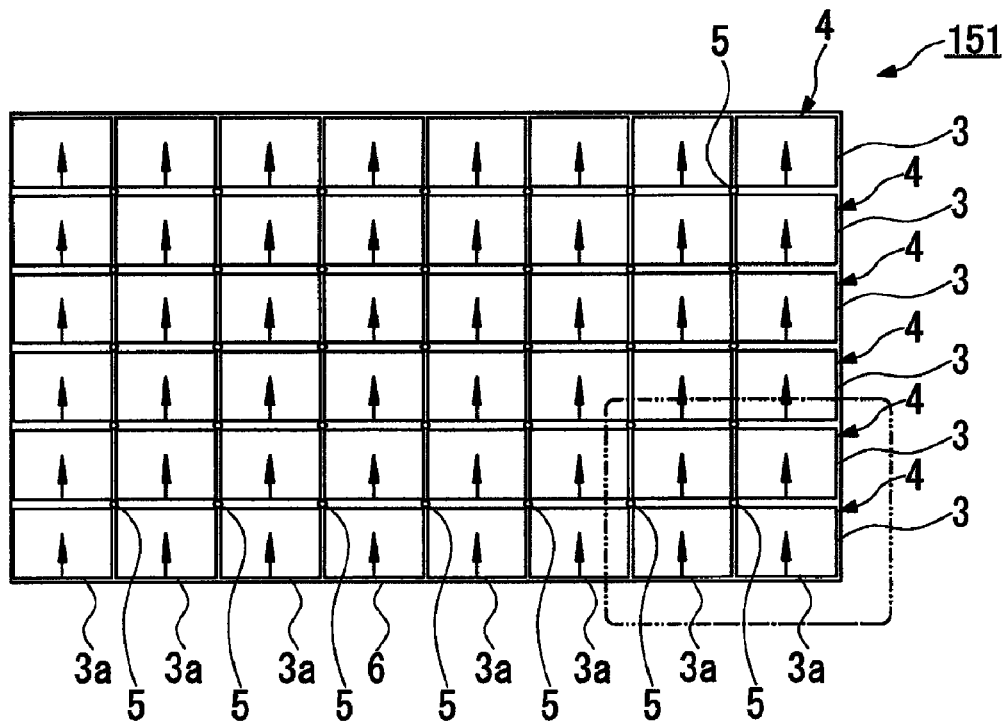
[Fig. 30]
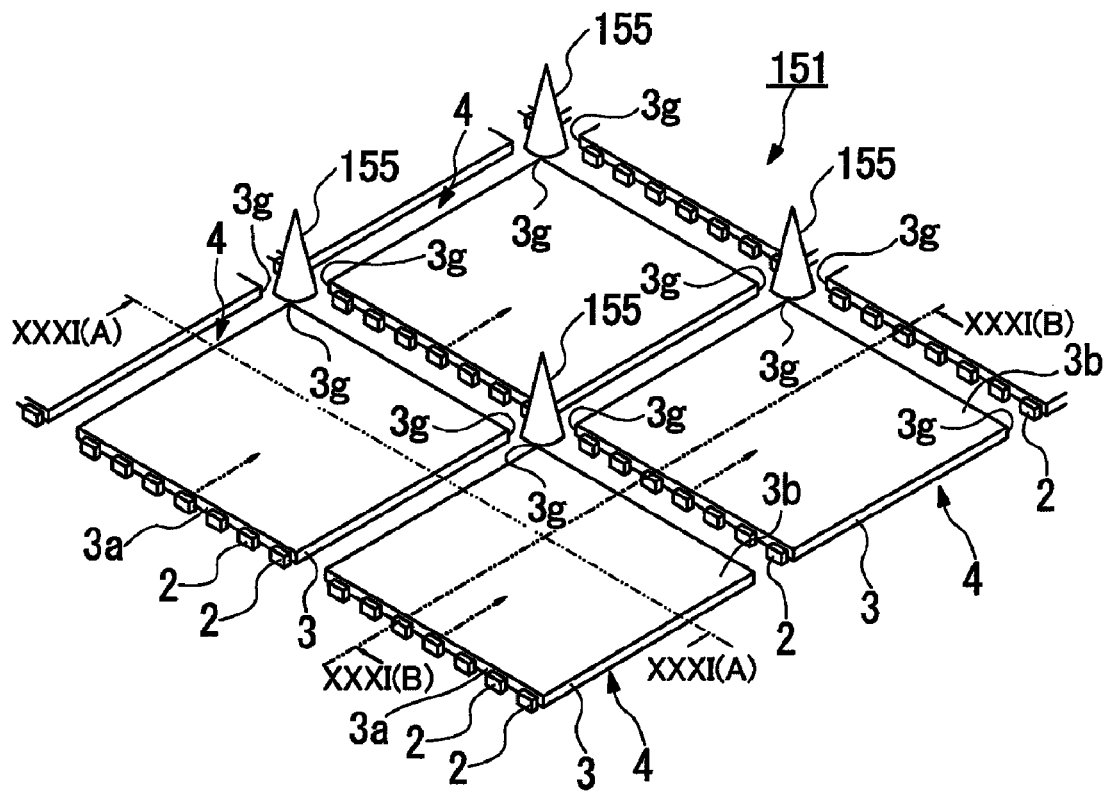

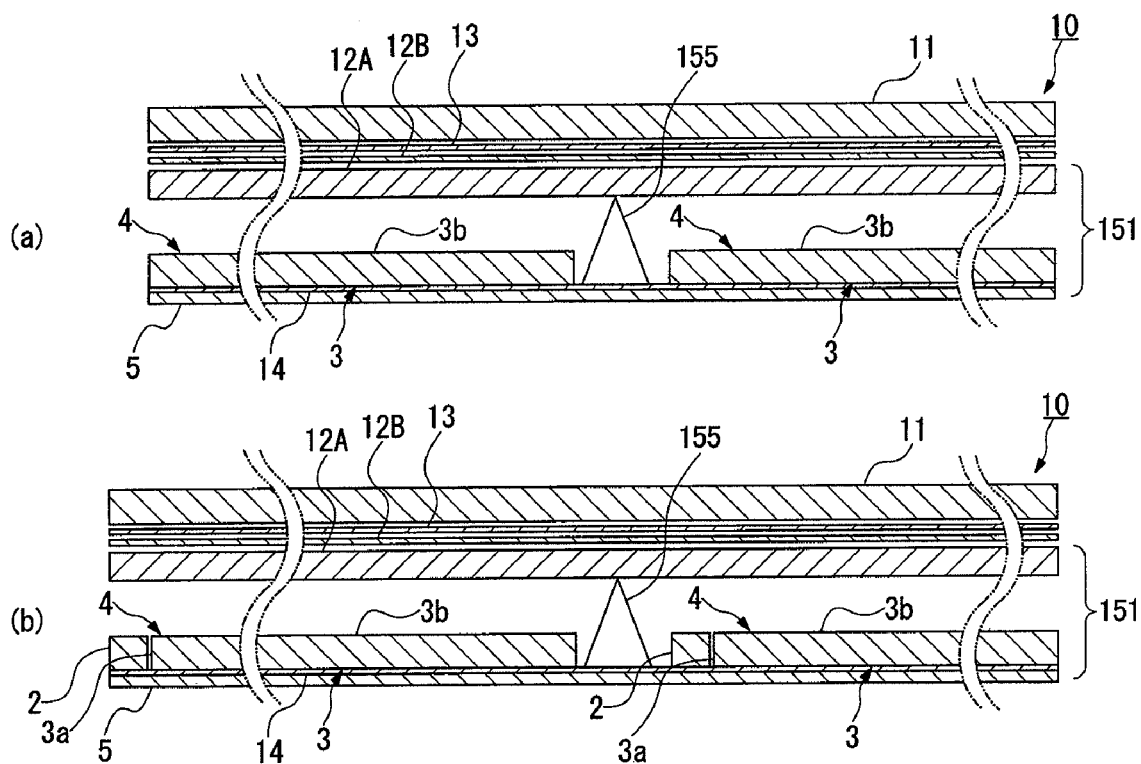
[Fig. 31]

PLANAR LIGHT-EMITTING DEVICE AND LIQUID CRYSTAL DISPLAY APPARATUS

This application claims priority under 35 U.S.C. §119 to Japanese Patent application No. JP2008-137153 filed on May 26, 2008, Japanese Patent application No. JP2008-276231 filed on Oct. 28, 2008, Japanese Patent application No. JP2008-272536 filed on Oct. 22, 2008 and Japanese Patent application No. JP2008-272537 filed on Oct. 22, 2008, the entire contents of which are hereby incorporated by reference.

TECHNICAL FIELD

The present invention relates to a planar light-emitting device that illuminates a liquid crystal display panel or the like. The present invention also relates to a liquid crystal display apparatus having the planar light-emitting device.

BACKGROUND ART

Liquid crystal display apparatuses for image display are widely used as large-sized displays of flat-screen televisions and monitors, etc. These liquid crystal display apparatuses employ a backlight unit that exits light to a liquid crystal display panel from the back or the lower side of the liquid crystal display panel to enhance the luminance of the display screen. The backlight unit has a lightguide plate and a light-emitting diode (LED) light source disposed at a peripheral side surface of the lightguide plate. The lightguide plate guides light from the light source and emits the guided light from the whole of a light-exiting surface of the lightguide plate toward the liquid crystal display panel that faces the lightguide plate.

Recently, as liquid crystal television systems increase in size, there has been a demand for further reduction in weight and thickness of backlight units used in the television systems. In this regard, as the thickness of a lightguide plate in a backlight unit is reduced, it becomes more likely that color irregularity and luminance unevenness will occur on the light-exiting surface of the lightguide plate. If injection molding is employed as a method of producing a large-sized lightguide plate, it is difficult to fill the resin material throughout the molding tool for the large lightguide plate. This problem can be solved by increasing the injection pressure. This, however, causes an increase in the cost of equipment.

Meanwhile, there has been developed a planar light-emitting device in which a plurality of lightguide plates having respective light sources are arranged side by side or in a matrix, with their respective upper surfaces as light-exiting surfaces being flush with each other to obtain a wide light-exiting surface as a whole (see Japanese Patent Application Publication Nos. Hei 9-186825, 2008-34372, 2006-164625, and 2005-228718).

The above-described conventional planar light-emitting device, however, still has the following problem to be solved. When a plurality of lightguide plates are arranged close adjacent to each other in a backlight unit, a predetermined clearance is provided between each pair of adjacent lightguide plates with possible assembling errors, plate thickness, thermal expansion, etc considered. Meanwhile, the respective peripheral side surfaces of the adjacently disposed lightguide plates are perpendicular to the integrated light-exiting surface of the backlight unit. Therefore, light reaching the peripheral side surfaces of the lightguide plates cannot sufficiently travel toward the light-exiting surfaces. For this reason, the gaps between the mutually adjacent peripheral side surfaces are likely to become dark spots.

SUMMARY OF THE INVENTION

The present invention has been made in view of the above-described problem with the conventional technique. Accordingly, an object of the present invention is to provide a planar light-emitting device having a plurality of lightguide plates arranged side by side to obtain a large light-exiting surface, which is designed to suppress the reduction in luminance at the gaps between the mutually adjacent peripheral side surfaces of the lightguide plates to obtain improved viewability. Another object of the present invention is to provide a liquid crystal display apparatus using the planar light-emitting device of the present invention.

The present invention provides a planar light-emitting device having a plurality of light-emitting units each including a light source and a lightguide plate having an upper surface as a light-exiting surface, a lower surface opposite to the light-exiting surface, and peripheral side surfaces extending between the respective peripheral edges of the upper and lower surfaces. The lightguide plate exits light received from the light source from the light-exiting surface. At least a part of the peripheral side surface is an inclined surface inclined relative to the light-exiting surface. The light-emitting units are arranged with the light-exiting surfaces of their respective lightguide plates being substantially flush with each other.

The inclined surface of the peripheral side surface enables the light entering the lightguide plate and reaching the peripheral side surface to readily exit toward the light-exiting surface and makes it possible to reduce the occurrence of a dark spot that is likely to appear near the peripheral side surface. It should be noted that the terms "upper surface", "lower surface", "upward", etc. as employed in this specification are used to specify a relative positional relationship between constituent elements, and that these terms should not be construed as specifying a particular absolute positional relationship.

Specifically, the planar light-emitting device may be arranged as follows. The lightguide plate has a light-entrance surface defined by a part of the peripheral side surface. The light source is adjacently opposed to the light-entrance surface to emit light into the lightguide plate through the light-entrance surface. At least a part of the peripheral side surface other than the light-entrance surface is the inclined surface.

The arrangement may be as follows. The light source has a light-emitting surface opposed to the lower surface of the lightguide plate, and the lightguide plate receives light from the light-emitting surface of the light source through the lower surface and emits the light from the light-exiting surface while propagating the light toward the peripheral side surface.

Alternatively, the arrangement may be as follows. The lightguide plate is polygonal in shape and has the light-entrance surface in at least one of its corners, and the light source is set with its light-emitting surface opposed to the light-entrance surface. If the light source emits light at a wider angle than the angle of the corner of the lightguide plate in which the light source is set, it is possible to eliminate the occurrence of a dark spot in the lightguide plate.

The inclined surface may face in an upward direction relative to the lightguide plate. In this case, the angle of the inclined surface relative to the light-exiting surface may be about 45 degrees.

Alternatively, the inclined surface may face in a downward direction relative to the lightguide plate.

The arrangement may be as follows. The inclined surface defined by a part of the peripheral side surface of the lightguide plate is an upward inclined surface facing in an upward direction relative to the lightguide plate, and the inclined surface defined by another part of the peripheral side surface is a downward inclined surface facing in a downward direction relative to the lightguide plate. In each pair of adjacent lightguide plates, the upward inclined surface of one lightguide plate is opposed to the downward inclined surface of the other lightguide plate.

In the arrangement in which the lightguide plate receives light through its lower surface, the lightguide plate may have on its light-exiting surface a recess tapered toward the lower surface. In this case, the wall surface that defines the recess directs light from the light source received through the lower surface of the lightguide plate toward the peripheral side surface of the lightguide plate.

The lower surface of the lightguide plate may be provided with a microscopic optical configuration section that directs the light guided through the lightguide plate toward the light-exiting surface.

The lightguide plate may have on its lower surface a housing recess that houses the light source. In this arrangement, the light source is installed in the housing recess.

The lightguide plates may be rectangular in shape and arranged in a matrix of a plurality of vertical rows and a plurality of horizontal rows. In each set of four mutually adjacent lightguide plates, only one of four corners of them abutting close to each other may have the light-entrance surface.

The arrangement may be as follows. The lightguide plates arranged in adjacent rows in one of the vertical or horizontal rows may have their respective light-entrance surfaces facing in opposite directions to each other between the adjacent rows.

In the arrangement in which the light-entrance surface is provided in at least one corner of the lightguide plate, the at least one corner of the lightguide plate may have a housing recess that houses the light source.

In this case, the arrangement may be as follows. The light source is mounted on a mounting substrate and the lightguide plate has a substrate-fitting groove adjacent to the housing recess in the at least one corner. The light source is disposed in the housing recess by inserting the mounting substrate into the substrate-fitting groove.

A reflector may be situated between mutually adjacent lightguide plates. The light emitted from the light-exiting surface of the lightguide plate and arrived at the reflector is deflected upward by the reflector to reduce the occurrence of a dark spot that is likely to appear between the adjacent lightguide plates.

In this case, the arrangement may be as follows. The lightguide plates are polygonal in shape, and the reflector is situated between the mutually closely disposed corners of each set of at least three mutually adjacent lightguide plates.

The reflector may be in the shape of a post tapered away from the light-exiting surface.

The planar light-emitting device may further have a diffusing plate situated over the lightguide plate at a distance from it. The diffusing plate is supported by the reflector.

In addition, the present invention provides a liquid crystal display apparatus including a liquid crystal display panel and the planar light-emitting device arranged as stated above, which is disposed underneath the liquid crystal display panel.

Embodiments of the present invention will now be explained below with reference to the accompanying drawings.

BRIEF DESCRIPTION OF THE DRAWINGS

FIG. 1 is a plan view of a planar light-emitting device according to a first embodiment of the planar light-emitting device according to the present invention.

FIG. 2 is a perspective view schematically showing two mutually adjacent light-emitting units in the first embodiment.

FIG. 3 is a fragmentary enlarged sectional view showing the liquid crystal display apparatus in the first embodiment with a liquid crystal display panel removed from it.

FIG. 4 is a fragmentary enlarged sectional view showing the liquid crystal display apparatus in the first embodiment.

FIG. 5 is a fragmentary enlarged sectional view showing a planar light-emitting device according to a second embodiment of the present invention.

FIG. 6 is a fragmentary enlarged sectional view showing a planar light-emitting device according to a third embodiment of the present invention.

FIG. 7 is a plan view of a planar light-emitting device according to a fourth embodiment of the present invention.

FIG. 8 is a plan view of a planar light-emitting device according to a fifth embodiment of the present invention.

FIG. 9 is a diagram showing planar light-emitting device samples to compare the luminance distributions on the light-exiting surfaces of planar light-emitting devices according to the present invention with the luminance distribution on the light-exiting surface of a conventional planar light-emitting device, of which: parts (i) to (iii) show respective main parts of the samples according to the present invention; and part (iv) shows a main part of a sample of the conventional planar light-emitting device.

FIG. 10 is a diagram showing the luminance distributions on the respective light-exiting surfaces of the planar light-emitting device samples shown in FIG. 9.

FIG. 11 is a diagram showing the luminance distributions near the peripheral side surfaces of a pair of mutually adjacent lightguide plates of the planar light-emitting device samples shown in FIG. 9.

FIG. 12 is a graph showing the luminance distributions near the peripheral side surfaces of the mutually adjacent lightguide plates shown in parts (i) and (iv) of FIG. 11.

FIG. 13 is a plan view of a planar light-emitting device according to a sixth embodiment of the present invention.

FIG. 14 is a diagram showing one lightguide plate of the planar light-emitting device shown in FIG. 13, of which: part (a) is a plan view; and part (b) is a side view.

FIG. 15 is a fragmentary enlarged vertical sectional view of a liquid crystal display apparatus having the planar light-emitting device according to the sixth embodiment.

FIG. 16 is a plan view of a planar light-emitting device according to a seventh embodiment of the present invention.

FIG. 17 is a diagram showing one lightguide plate of the planar light-emitting device shown in FIG. 16, of which: part (a) is a plan view; and part (b) is a side view.

FIG. 18 is a fragmentary enlarged vertical sectional view of a liquid crystal display apparatus having a planar light-emitting device according to an eighth embodiment of the present invention.

FIG. 19 is a fragmentary enlarged vertical sectional view of a liquid crystal display apparatus having a planar light-emitting device according to a ninth embodiment of the present invention.

FIG. 20 is a fragmentary enlarged vertical sectional view of a liquid crystal display apparatus having a planar light-emitting device according to a tenth embodiment of the present invention.

FIG. 21 is a plan view of a planar light-emitting device according to an eleventh embodiment of the present invention.

FIG. 22 is a diagram showing one lightguide plate of the planar light-emitting device according to the eleventh embodiment, of which: part (a) is a plan view; and part (b) is a side view.

FIG. 23 is a fragmentary enlarged vertical sectional view of a liquid crystal display apparatus having the planar light-emitting device according to the eleventh embodiment of the present invention.

FIG. 24 is a plan view of one lightguide plate of the planar light-emitting device shown in FIG. 23.

FIG. 25 is a side view of the lightguide plate in FIG. 24 as seen in the direction of the arrow XXV.

FIG. 26 is a diagram showing one lightguide plate of a planar light-emitting device according to a twelfth embodiment of the present invention, of which: part (a) is a plan view; and part (b) is a side view.

FIG. 27 is a fragmentary enlarged vertical sectional view of a liquid crystal display apparatus in the main part having a planar light-emitting device according to a thirteenth embodiment of the present invention.

FIG. 28 is a fragmentary enlarged vertical sectional view of a liquid crystal display apparatus in the main part having a planar light-emitting device according to a fourteenth embodiment of the present invention.

FIG. 29 is a plan view of a planar light-emitting device according to a fifteenth embodiment of the present invention.

FIG. 30 is a perspective view showing four light-emitting units encircled with the two-dot chain line in FIG. 29.

FIG. 31 is a diagram showing a liquid crystal display apparatus having the planar light-emitting device according to the fifteenth embodiment, of which: part (a) is a sectional view taken along the line XXXI(A)-XXXI(A) in FIG. 30; and part (b) is a sectional view taken along the line XXXI(B)-XXXI (B) in FIG. 30.

Embodiments of the planar light-emitting device and liquid crystal display apparatus according to the present invention will now be explained below with reference to the accompanying drawings. It should be noted that, in the figures used in the following description, constituent members are drawn at an appropriate scale for the sake of explanation.

DETAILED DESCRIPTION OF THE INVENTION

FIGS. 1 to 3 show one embodiment of a planar light-emitting device 1 according to the present invention, and FIG. 4 is a cross-sectional schematic view showing a part of a liquid crystal display panel 10 using the planar light-emitting device 1 according to the present invention. The planar light-emitting device 1 is used as a backlight unit of the liquid crystal display apparatus 10. The planar light-emitting device 1 has a plurality of light-emitting units 4. Each light-emitting unit 4 has, as shown in FIG. 2, a lightguide plate 3 and a plurality of LED light sources (light source) 2 provided along one side of the lightguide plate 3 as a light-entrance surface 3a. The lightguide plate including an upper surface as light-exiting surface, a lower surface opposite to the upper surface, and peripheral side surfaces extending between edges of the lower surface and edges of the upper surface. As shown in FIG. 1, the plurality of light-emitting units 4 are disposed with their respective lightguide plates 3 being aligned in a matrix of vertical rows and horizontal rows and with the LED light sources 2 aligned in each of horizontal rows along one side of the lightguide plates 3 or a part of the peripheral side surfaces. In the illustrated example, the lightguide plates 3 are rectangular in shape and 48 lightguide plates are aligned in a matrix of 8 vertical rows and 6 horizontal rows. With this arrangement, the planar light-emitting device 1 has an aspect ratio of 16:9, which is the mainstream aspect ratio for a large-sized backlight unit. The respective upper surfaces of the lightguide plates 3 as light-exiting surfaces are substantially flush with each other and work as an integrated light-exiting surface of the planar light-emitting device 1.

Of the peripheral side surfaces of each lightguide plate 3, the light-entrance surface 3a is a part of the peripheral side surfaces and perpendicular to the upper surface of the lightguide plate 3, and the upper surface serves as a light-exiting surface 3b and the light-entrance surface in the illustrated embodiment receives light from the LED light sources 2 to efficiently guide the light through the lightguide plate 3. Each lightguide plate 3 has peripheral side surfaces 3c extending between the edges of the lower surface and the edges of the upper surface. At least a part of peripheral side surfaces 3c other than the light-entrance surface are not perpendicular but inclined inward from the edges of the lower surface toward the edges of the light-exiting surface 3b. That is, the peripheral side surfaces 3c, in this embodiment, other than the light-entrance surface are upward and inward inclined surfaces that are at an angle of about 45° toward the light-exiting surface 3b. In this embodiment, the front peripheral side surface (as viewed in FIG. 1) of each lightguide plate 3 is a light-entrance surface 3a, and only the right and left peripheral side surfaces 3c are inclined surfaces. In this regard, the rear peripheral side surface opposite to the light-entrance surface 3a may also be an inclined surface. The inclined peripheral side surfaces 3c may be provided with microscopic optical configurations, e.g. dot- or prism-shaped microscopic optical configurations, to allow as much light as possible to be directed upward from the peripheral side surfaces 3c.

The lightguide plates 3 are arranged with their mutually adjacent peripheral side surfaces being spaced from each other by a distance of several millimeters with possible assembling errors, etc considered.

The lightguide plates 3 are formed of a transparent polycarbonate or acrylic resin, for example. For example, the lightguide plates 3 are secured to a bezel (not shown), and in this state, installed on a rigid board 5. The LED light sources 2 of each lightguide plate 3 are connected to a flexible printed circuit board (not shown) secured to the bezel.

Each lightguide plate 3 preferably has a plurality of light-entrance prisms (not shown) of V-shaped sectional configuration, for example, formed on each of a plurality of regions of the light-entrance surface 3a that face the LED light sources 2, respectively. The light-entrance prisms allow light entering through the light-entrance surface 3a to be propagated while being diffused in the width direction of the light-entrance surface 3a. For the same reason, it is preferable to form a white dot pattern (not shown), for example, on the upper surface of the lightguide plate 3, which is a light-exiting surface. The upper surface of the lightguide plate 3 or its lower surface, which is opposite to the upper surface, may be provided with prism- or lenticular lens-shaped microscopic optical configurations, for example. If the upper or lower surface is provided with prism-shaped microscopic optical configurations, the apex angle of the prisms is gradually increased with the microscopic optical configurations being situated farther away from the LED light sources 2. In addition, the depth of the prism configuration is gradually increased or the prism pitch is gradually decreased as the prism apex angle increases.

The LED light sources 2 may be white LEDs installed with their light-emitting surfaces disposed to face the light-entrance surface 3a. Each white LED is, for example, a semiconductor light-emitting element, e.g. a blue (wavelength λ: 470 to 490 nm) LED element or an ultraviolet (wavelength λ: less than 470 nm) LED element, which may be formed by stacking a plurality of semiconductor layers of a gallium nitride compound semiconductor (e.g. InGaN compound semiconductor) on an insulating substrate, e.g. a sapphire substrate, and sealing the stack of semiconductor layers with a resin material. The resin material may be formed, for example, by adding a YAG fluorescent substance into a silicone resin as a main component. The YAG fluorescent substance converts blue or ultraviolet light from the semiconductor light-emitting element into yellow light, and white light is produced by color mixing effect. It is preferable for the LED light source 2 to have a reflecting frame formed over the peripheral side surfaces of the resin material except the light-emitting surface that emits light only from the light-emitting surface and faces the light-entrance surface of the lightguide plate 3. It should be noted that various white LEDs besides those described above may be employed as the LED light sources 2.

The liquid crystal display apparatus 10 shown in FIG. 4 is a display apparatus applicable to a liquid crystal display of a large-sized liquid crystal television, for example. As shown in FIGS. 3 and 4, the liquid crystal display apparatus 10 has a liquid crystal display panel 11 and the above-described planar light-emitting device 1 disposed underneath or at the lower side of the display panel 11.

The liquid crystal display apparatus 10 includes the planar light-emitting device 1 and a combination of a diffusing plate 12A and a diffusing sheet 12B successively laid over the planar light-emitting device 1 to make uniform, as a whole, the intensity of light directed to the liquid crystal display panel 11 from the planar light-emitting device 1. The liquid crystal display apparatus 10 further includes a prism sheet 13 disposed over the diffusing sheet 12B to direct light from the diffusing sheet 12B upward toward the liquid crystal display panel 11, which is disposed over the prism sheet 13, and a reflecting sheet 14 disposed underneath the lightguide plates 3.

The diffusing plate 12A and the diffusing sheet 12B are a plate and a sheet, respectively, made of a transparent resin, e.g. an acrylic or polycarbonate resin, having silica particles or the like dispersed in the diffusing plate 12A and the diffusing sheet 12B.

The prism sheet 13 has on its upper surface a plurality of mutually parallel prisms. The prism sheet 13 is set with the prisms intersecting the optical axes of light from the LED light sources 2 as viewed in a plan view. To obtain high directivity of exiting light in the upward direction, in particular in this particular embodiment, the prism sheet 13 is set with the prisms perpendicularly intersecting the optical axes of light from the LED light source 2 as viewed in a plan view.

The reflecting sheet 14 is a metal plate, film, foil or the like having a light-reflecting function. In this embodiment, the reflecting sheet 14 is a film provided with an evaporated silver layer. It should be noted, however, that an evaporated aluminum layer or the like may be used in place of the evaporated silver layer. The reflecting sheet 14 is bonded to the surface of the bezel by using a double-coated adhesive tape (not shown).

The liquid crystal display panel 11 is a transmissive or semitransmissive liquid crystal display panel. In the case of a transmissive liquid crystal display panel 11, for example, it has a panel body having a liquid crystal material, e.g. TN liquid crystal or STN liquid crystal, sealed with a sealant in a gap between an upper substrate and a lower substrate, each having a transparent electrode layer, an alignment film and a polarizer.

Thus, in the planar light-emitting device 1 of this embodiment, the peripheral side surfaces 3c of each pair of adjacent lightguide plates 3, except the respective light-entrance surfaces 3a, are inclined surfaces inclined upward and inward from the edges of the lower surface toward the edges of the light-exiting surfaces 3b face. Therefore, a larger part of light reaching the inclined peripheral side surfaces 3c in the lightguide plates 3 is easily emitted to the outside, resulting in an increase in the luminance at the gap between the adjacent peripheral side surfaces 3c.

In addition, owing to the increase in the luminance at the gap between the lightguide plates 3, the clearance between adjacent lightguide plates 3 can be set wider than in the conventional structure. This allows the planar light-emitting device 1 to be designed with more flexibility with the lightguide plate securing method, possible assembling errors, plate thickness, thermal expansion, etc considered. Accordingly, the liquid crystal display apparatus 10 using the planar light-emitting device 1 as a backlight unit can utilize laterally emitted light at the gaps between the lightguide plates and can provide favorable large-area image display having higher luminance uniformity.

FIG. 5 shows a planar light-emitting device 21 according to a second embodiment of the present invention. In the following explanation, constituent elements corresponding to those in the foregoing first embodiment are denoted by the same reference numerals as used in the first embodiment, and a detailed description of them is omitted herein.

The second embodiment differs from the first embodiment in that, in the second embodiment, the peripheral side surfaces 3c except the light-entrance surface 3a of each lightguide plate 3 are inclined surfaces inclined upward and outward from the edges of the lower surface toward the edges of the light-exiting surface 3b. In other words, the peripheral side surfaces 3c face toward the reflecting sheet 14. Thus, the reflecting sheet 14 reflects light exiting the peripheral side surfaces 3c toward the light-exiting surface 3b to increase the luminance at the gap between the mutually adjacent peripheral side surfaces 3c.

FIG. 6 shows a planar light-emitting device 31 according to a third embodiment of the present invention. In this embodiment, one of the mutually adjacent peripheral side surfaces 3c of a pair of adjacent lightguide plates 3 is an inclined surface inclined upward and inward from the edge of the lower surface toward the corresponding edge of the light-exiting surface 3b of the lightguide plate 3, and the other of the adjacent peripheral side surfaces 3c is an inclined surface inclined upward and outward from the edge of the lower surface toward the corresponding edge of the light-exiting surface 3b. The two inclined surfaces are opposed parallel to each other. Consequently, the peripheral side surfaces 3c of the lightguide plates 3 overlap each other at the adjacently disposed two inclined surfaces opposed parallel to each other in a plan view as seen from the light-exiting surface 3b side. Thus, light rays exiting the two peripheral side surfaces 3c are superimposed on one another to increase the luminance at the gap between the peripheral side surfaces 3c.

FIG. 7 shows a planar light-emitting device 41 according to a fourth embodiment of the present invention.

The planar light-emitting device 41 has a plurality of substantially rectangular lightguide plates 3 each having a pair of chamfered diagonally opposing corners. The lightguide plates 3 are arranged side by side in an oblique direction (diagonal direction of each rectangular lightguide plate). In this embodiment, the obliquely arranged lightguide plates 3 have oblique peripheral side surfaces 3$c$ formed by their mutually adjacent chamfered diagonally opposing corners. Only the oblique peripheral side surfaces 3$c$ are inclined surfaces inclined relative to the associated light-exiting surfaces 3$b$, the inclined surfaces inclined upward and inward from the edges of the lower surface to the edges of the upper surface. The inclined surfaces 3$c$ of each lightguide plate 3 face toward the direction that the light-exiting surface 3$b$ faces. This arrangement can increase the luminance at the gap between each pair of adjacent lightguide plates 3.

FIG. 8 shows a planar light-emitting device 51 according to a fifth embodiment of the present invention.

The planar light-emitting device 51 has a plurality of hexagonal lightguide plates 3 arranged in a zigzag pattern. The peripheral side surfaces 3$c$ of each pair of adjacent lightguide plates 3 are inclined surfaces inclined upward and inward from the edges of the lower surface toward the edges of the light-exiting surface 3$b$, the incline surfaces facing toward the direction that the associated light-exiting surfaces 3$b$ face. Accordingly, it is also possible in the fifth embodiment to increase the luminance at the gap between the peripheral side surfaces 3$c$ of each pair of adjacent hexagonal lightguide plates 3.

The planar light-emitting devices according to the fourth and fifth embodiments can be formed into large-area planar light-emitting devices by two-dimensionally arranging lightguide plates 3.

FIGS. 10 and 11 show the results of measurement of the luminance distribution over the light-exiting surfaces of four planar light-emitting devices each having four lightguide plates arranged in a matrix of 2 vertical rows and 2 horizontal rows. The four planar light-emitting devices have peripheral side surfaces 3$c$ as shown in parts (i), (ii), (iii) and (iv) of FIG. 9, respectively.

Part (i) of FIG. 9 shows an arrangement corresponding to the first embodiment shown in FIG. 1, in which both the peripheral side surfaces 3$c$ of adjacent lightguide plates 3 are inclined to face toward the direction that the light-exiting surfaces 3$b$ face. Part (i) of FIG. 10 shows luminance distributions obtained when the spacing between the peripheral side surfaces 3$c$ is set at 0 mm, 1 mm, and 2 mm, respectively. Parts (ii), (iii) and (iv) of FIG. 9 respectively show arrangements corresponding to the second embodiment shown in FIG. 5, the third embodiment shown in FIG. 6, and a conventional example in which the peripheral side surfaces 3$c$ are perpendicular to the light-exiting surfaces 3$b$. Parts (ii), (iii) and (iv) of FIG. 10 show the results of measurement of luminance distributions regarding the arrangements shown in parts (ii), (iii) and (iv) of FIG. 9.

The measurement results revealed the following. In part (i) of FIG. 10, when the distance x is 0 mm, the luminance unevenness was the smallest, and the rate of change of the luminance at the joint between the peripheral side surfaces 3$c$ with respect to the overall average luminance of the planar light-emitting device was 18%. In part (ii) of FIG. 10, when the distance x is 2 mm, the luminance unevenness was the smallest, and the rate of change of the luminance was 14%. In part (iii) of FIG. 10, when the distance x is any of 0 mm, 1 mm and 2 mm, bright lines appear near the peripheral side surfaces 3$c$ of the adjacent lightguide plates 3. On the contrary, in the conventional example shown in part (iv) of FIG. 10, the gap between the peripheral side surfaces 3$c$ of the adjacent lightguide plates 3 is dark when the distance x is any of 0 mm, 1 mm and 2 mm.

Parts (i) to (iv) of FIG. 11 show luminance distributions near the peripheral side surfaces 3$c$ of the adjacent lightguide plates 3 shown in parts (i) to (iv) of FIG. 9 when the distance x is widened stepwise by 1 mm from 0 mm to 7 mm.

As a result, in part (i) of FIG. 11, when the distance x is 6 mm, the viewability was the best, and the above-described rate of change of the luminance was 7%. In part (ii) of FIG. 11, when the distance x is any of 0 mm, 1 mm, 2 mm and 3 mm, bright lines appear near the peripheral side surfaces 3$c$ of the adjacent lightguide plates 3. It should be noted that, in part (ii) of FIG. 11, when the distance x is 3 mm, the gap between the peripheral side surfaces 3$c$ of the adjacent lightguide plates 3 was dark, and the viewability could not be improved when the distance x is further increased. Therefore, the luminance distributions when the distance x is 4 mm or more are not shown in the figure. In part (iii) of FIG. 11, when the distance x is any of 0 mm to 7 mm, bright lines appear near the peripheral side surfaces 3$c$ of the adjacent lightguide plates 3. On the contrary, in the conventional example for comparison, the viewability is the best when the distance x is 0 mm. From the viewpoint of actual mounting, however, a clearance is needed between the lightguide plates 3; therefore, it is difficult to set the distance x at 0 mm. In addition, in part (iv) of FIG. 11, when the distance x is increased, emission lines have appeared undesirably.

FIG. 12 is a graph showing the respective luminance distributions of the arrangement (x=6 mm) shown in part (i) of FIG. 11 and the arrangement (x=0 mm) shown in part (iv) of FIG. 11, which have the best viewability. As will be understood from the graph, the arrangement shown in part (iv) of FIG. 11 has a local reduction in the luminance at the center (joint), whereas the arrangement shown in part (i) of FIG. 11 has no local reduction in the luminance at the center (joint). Thus, the present invention is free from a dark spot at the joint and allows the viewability to be improved by adjusting the distance x.

FIGS. 13 to 15 show a planar light-emitting device 61 according to a sixth embodiment of the present invention.

The planar light-emitting device 61 comprises a plurality of light-emitting units 4 each having an LED (light-emitting diode) light source (light source) 2 with its optical axis 2$a$ oriented directly upward and a lightguide plate 3 that receives light from the LED light source 2 through the lower surface of the lightguide plate 3 and the upper surface as light-exiting surface emits the light from the whole of its upper surface as a light-exiting surface 3$b$. The light-emitting units 4 are arranged side by side with their lightguide plates 3 being adjacent to each other.

The lightguide plates 3 are square when viewed in a plan view and aligned in a matrix of a plurality of vertical rows and a plurality of horizontal rows. In this embodiment, the light-emitting units 4 are aligned in a matrix of 8 vertical rows and 4 horizontal rows under the respective lightguide plates 3. The horizontal rows extend in the long-side direction of the matrix, and the vertical rows in the short-side direction. The lightguide plates 3 may be arranged in an aspect ratio of 16:9, which is the mainstream aspect ratio for large-sized backlight units.

Four peripheral side surfaces 3$c$ of mutually adjacent lightguide plates 3 are all inclined surfaces inclined upward and inward from edges of the lower surface toward the edges of the light-exiting surface, the inclined surface facing toward the direction that the light-exiting surfaces 3$b$ face.

Each lightguide plate 3 has a reflecting recess 3d formed on its light-exiting surface 3b at a position directly above the LED light source 2. The reflecting recess 3d is formed around the center of the optical axis 2a of the LED light source 2. The reflecting recess 3d has a mortar shape or a substantially inverted conical shape with a circular cross-sectional configuration. The inclined surface of the reflecting recess 3d is a quadric surface. The reflecting recess 3d may be provided with irregularities that facilitate reflection, scattering or emission of light.

In addition, the lightguide plate 3 has a microscopic optical configuration section 3e formed on its lower surface except an area directly above the LED light source 2 to reflect, refract or diffuse light toward the light-exiting surface 3b. The microscopic optical configuration section 3e may, for example, be a prism-shaped configuration section comprising a plurality of grooves and ridges, or a multiplicity of dot-shaped configurations formed by dot printing, for example.

The lightguide plates 3 are, for example, secured to a bezel (not shown), and in this state, installed over a rigid board 5 with a predetermined distance between them. Alternatively, the lightguide plates 3 may be installed as follows. Pins are provided on the lower surface of each lightguide plate 3, and the pins are inserted into respective holes provided in the rigid board 5 to install the lightguide plate 3 over the rigid board 5 at a predetermined distance from it.

It is preferable for the LED light source 2 to have a reflecting frame formed over the peripheral surfaces of the resin material except the light-emitting surface to emit light only from the upper surface of the LED light source 2 facing the lower surface of the lightguide plate 3.

Thus, in the planar light-emitting device 61 of this embodiment, the peripheral side surfaces 3c of the mutually adjacent lightguide plates 3 are inclined upward and inward from the edges of the lower surface to the upper surface of the lightguide plate 3. Accordingly, it is possible to increase the luminance at the gap between the adjacent peripheral side surfaces 3c in the same way as in the foregoing embodiments.

Further, each lightguide plate 3 has the reflecting recess 3d formed on its light-exiting surface 3b. Therefore, the inclined surface of the reflecting recess 3d reflects the light which was emitted directly upward from the LED light source 2 and entered into the lightguide plate 3, and thus deflects the optical path of the light toward the peripheral side surfaces 3c. Accordingly, it is possible to suppress the occurrence of a hot spot directly above the LED light source 2 and to improve the luminance uniformity.

In addition, the microscopic optical configuration section 3e formed on the lower surface of the lightguide plate 3 suppresses the emission of light to the outside through the lower surface as well as efficiently direct light guided through the lightguide plate 3 toward the light-exiting surface 3b. Thus, the overall luminance on the light-exiting surface 3b can be increased.

Further, because the lightguide plates 3 are square in shape and aligned in a matrix of a plurality of vertical rows and a plurality of horizontal rows, local dimming can be readily realized by local luminance control in which the LED light sources 2 are selectively driven for each individual lightguide plate 3. An example of local dimming may be as follows. The luminance of backlight is controlled according to the luminance or contrast of an image displayed on the liquid crystal display panel 11, and the luminance of backlight can further be controlled for each lightguide plate 3 based on image data input to the liquid crystal display panel 11 to adjust the brightness. By so doing, it is possible to reduce the power consumption and to improve the contrast, the moving picture follow-up property, etc.

Accordingly, the liquid crystal display apparatus 10 which employs the planar light-emitting device 61 as a backlight unit can suppress the reduction in luminance at the gap between the lightguide plates 3 to provide large-area image display of favorable viewability.

FIGS. 16 and 17 show a planar light-emitting device 71 according to a seventh embodiment of the present invention. The planar light-emitting device 71 has lightguide plates 3 of regular hexagonal shape viewed in a plan view.

FIG. 18 shows a liquid crystal display apparatus having a planar light-emitting device 81 according to an eighth embodiment of the present invention. In the planar light-emitting device 81, each lightguide plate 3 has a housing recess 3f formed in the center of its lower surface of the lightguide plate 3 to house the LED light source 2. Unlike that shown in FIG. 15, the lightguide plate 3 of the planar light-emitting device 81 is mounted directly on the reflecting sheet 14.

In the planar light-emitting device 81, the LED light source 2 is installed in the housing recess 3f formed on the lower surface of the lightguide plate 3. Therefore, the overall thickness can be reduced by at least the height of the LED light source 2. In addition, not only the light emitted directly upward from the LED light source 2 but also the light emitted laterally from the LED light source 2 into the periphery of the housing recess 3f, inperpendicular or oblique directions to the optical axis 2a can be made to efficiently enter the lightguide plate 3 through the housing recess 3f. Thus, the luminance can be increased. The inner surface of the housing recess 3f may be an inclined surface or a curved surface that directs the light emitted directly above from the LED light source 2 toward the peripheral side surfaces 3c.

FIG. 19 shows a liquid crystal display apparatus having a planar light-emitting device 91 according to a ninth embodiment of the present invention. In the planar light-emitting device 91, the peripheral side surfaces 3c of each lightguide plate 3 are inclined surfaces inclined upward and outward from the edges of the edges of the lower surface toward the edges of the upper surface of the lightguide plate 3, in the same way as in the second embodiment shown in FIG. 5. The advantageous effects of the inclined peripheral side surfaces 3c are the same as those of the second embodiment shown in FIG. 5.

FIG. 20 shows a liquid crystal display apparatus having a planar light-emitting device 101 according to a tenth embodiment of the present invention. In the planar light-emitting device 101, the peripheral side surfaces 3c of the mutually adjacent lightguide plates 3 are inclined to oppose parallel to each other, in the same way as in the third embodiment shown in FIG. 6. The advantageous effects of the inclined peripheral side surfaces 3c are the same as those of the third embodiment.

FIGS. 21 to 23 show a planar light-emitting device 111 according to an eleventh embodiment of the present invention.

The planar light-emitting device 111 comprises a plurality of light-emitting units 4 arranged in a matrix of 8 vertical rows and 4 horizontal rows. Each light-emitting unit 4 has an LED light source (light source) 2 and a lightguide plate 3 of substantially square shape viewed in a plan view.

The LED light source 2 is installed in one of four corners 3g of the lightguide plate 3, which has a substantially square shape viewed in a plan view. The corner 3g of the lightguide plate 3 is provided with a rectangular housing recess 3h capable of housing the LED light source 2. The corner 3g of the lightguide plate 3 has a planar light-entrance surface 3a that is an interior surface of the housing recess 3h, and the light-entrance surface 3a faces the light-emitting surface 2b of the LED light source 2.

The divergence angle θ of light emitted from the LED light source 2 and guided through the lightguide plate 3 is set not smaller than the angle of the corner 3g of the lightguide plate 3 in which the LED light source 2 is disposed. That is, the angle of the corner 3g of the lightguide plate 3 is 90°; therefore, the divergence angle θ of light diverging in the lightguide plate 3 from the light-entrance surface 3a as a starting point is set not smaller than 90°. Thus, the lightguide plate 3 guides light diverging from the light-entrance surface 3a as a starting point at a divergence angle θ not smaller than the angle of the corner 3g. Accordingly, the light diverges sufficiently from the corner 3g to prevent the occurrence of a dark spot. In addition, the luminance of the lightguide plate 3 can be increased. It should be noted that the light radiation angle of the LED light source 2 is set to allow the divergence angle θ to be a desired one with the refraction of light according to the refractive index of the air and that of the lightguide plate 3 considered.

The LED light source 2 is provided in only one of the four corners 3g of each lightguide plate 3. As shown in the left top of FIG. 21, four lightguide plates 3A, 3B, 3C and 3D are arranged adjacent to each other with their respective corners 3g abutting close to each other at the center of the four lightguide plates 3A, 3B, 3C, and 3D. Of the adjacently disposed four corners 3g at the center of the respective lightguide plates, only the corner 3g of one lightguide plate 3A has an LED light source 2 installed in it. No LED light source 2 is installed in other three corners 3g at the center of the other lightguide plates 3B, 3C and 3D. The orientation of each lightguide plate 3 is set to realize an arrangement in which an LED light source 2 is disposed in only one corner 3g in all places where four corners 3g are abutting close to each other at the center of four adjacently disposed lightguide plates.

The lightguide plates 3 aligned one behind another in one vertical row in FIG. 21 have LED light sources 2 disposed in same corresponding corners 3g that are different positions from those of the lightguide plates 3 in another adjacently disposed vertical row that is adjacent to the first-mentioned vertical row. Thus, the light-emitting surfaces 2b of the LED light sources 2 of the lightguide plates 3 in each pair of adjacent vertical rows face in different directions from each other. For example, in the left end vertical row (the first row from the left) in FIG. 21, the LED light source 2 is disposed in the right front corner 3g of each lightguide plate 3 to emit light obliquely left through the lightguide plate 3. In a vertical row rightward adjacent to the left end row (i.e. the second row from the left), the LED light source 2 is disposed in the right rearward corner 3g of each lightguide plate 3 to emit light obliquely left forward in FIG. 21.

The four peripheral side surfaces 3c of the mutually adjacent lightguide plates 3 are, as shown in FIGS. 21 and 23, inclined surfaces inclined upward and inward from the edges of the lower surface toward the edges of the light-exiting surface of the lightguide plate, the inclined surfaces facing toward the direction that the respective light-exiting surfaces 3b face.

In the planar light-emitting device 111 of this embodiment, the LED light source 2 is installed in one corner 3g of each lightguide plate 3, and the light-entrance surface 3a is formed in the corner 3g where the LED light source 2 is disposed, and the light-entrance surface 3a of the lightguide plate 3 faces the light-emitting surface 2b of the LED light source 2. Accordingly, the lightguide plate 3 receives light entering through the light-entrance surface 3a in the corner 3g while guiding the light to diverge throughout the lightguide plate 3 from the corner 3g as a starting point, which has an angle narrower than 180°. Thus, the occurrence of a dark spot can be reduced.

In addition, an LED light source 2 needs to be disposed in only one corner 3g of each lightguide plate 3, there is no problem of lighting variation as experienced when a plurality of LED light sources 2 are disposed along the peripheral side surface of the lightguide plate 3. In addition, the number of LED light sources 2 used can be reduced, and the parts cost can be reduced. Further, because the LED light source 2 is disposed in the corner 3g of each lightguide plate 3, there occurs no dark spot due to the LED light source 2 and the mounting substrate for it between the peripheral side surfaces 3c of the mutually adjacent lightguide plates 3. Accordingly, the overall viewability of the planar light-emitting device 111 is improved.

Further, in each place where the four corners of four mutually adjacent lightguide plates 3 are abutting close to each other, the LED light source 2 of one of the lightguide plates 3 is disposed, and the LED light source 2 of another of the four lightguide plates 3 is directed to emit light toward the four abutting corners. With this arrangement, it is possible to suppress the reduction in luminance at the four corners abutting close to each other.

In each pair of adjacent vertical rows, the lightguide plates 3 arranged side by side in one vertical row of the pair have the LED light sources 2 disposed in their respective corners 3g different from those of the lightguide plates 3 in the other vertical row of the pair. That is, the light-emitting surfaces 2b of the LED light sources 2 in the pair of adjacent vertical rows face in different directions from each other. Therefore, the light entering direction changes every vertical row, and the pattern of highs and lows in the luminance distribution differs between adjacent vertical rows. Accordingly, the luminances on the adjacent lightguide plates 3 can be averaged to obtain favorable luminance uniformity as a whole.

In addition, the corner 3g of each lightguide plate 3 is provided with a housing recess 3h capable of housing an LED light source 2. Therefore, the LED light source 2 disposed in the corner 3g is housed in the recess 3h to prevent it from interfering with other adjacent lightguide plates 3. Accordingly, the lightguide plates 3 can be arranged close to each other. Not only the light emitted from the LED light source 2 in the optical axis direction but also the light emitted sideward from the LED light source 2 can be made to efficiently enter the lightguide plate 3 through the inner surface of the housing recess 3f. Thus, the luminance can be increased.

Further, because the peripheral side surfaces 3c of the mutually adjacent lightguide plates 3 are inclined relative to the associated light-exiting surfaces 3b, the peripheral side surfaces 3c allow light to easily exit to the outside. Accordingly, the luminance at the gap between the peripheral side surfaces 3c is increased.

FIGS. 24 to 28 show twelfth to fourteenth embodiments of the planar light-emitting device and liquid crystal display apparatus according to the present invention.

FIGS. 24 and 25 show a light-emitting unit 4 according to the twelfth embodiment. In the light-emitting unit 3, an LED light source 2 is secured to the surface of a strip-shaped mounting substrate 126 prepared separately. The mounting substrate 126 is inserted into a substrate-fitting groove 3i formed in the upper surface at the corner 3g of the lightguide plate 3 and adjacently disposed at the housing recess 3h that houses the LED light source 2. The substrate-fitting groove 3i extends perpendicularly to the diagonal line of the lightguide plate 3 that passes through the corner 3g, and the optical axis of the LED light source 2 is coincident with the diagonal line. The mounting substrate 126 has a printed circuit (not shown) and external connection terminals (not shown) patterned on its surface. The printed circuit is electrically connected to the LED light source 2 mounted on the center of the surface of the mounting substrate 126. In this embodiment, the LED light source 2 can be positioned and secured to the corner 3g simply by inserting the mounting substrate 126 into the substrate-fitting groove 3i. Thus, the mounting process for the LED light source 2 is facilitated.

The thirteenth embodiment shown in FIGS. 26 and 27 differs from the eleventh embodiment shown in FIGS. 21 to 23 in that all the four peripheral side surfaces 3c of the lightguide plate 3 are inclined surfaces inclined upward and outward from the edges of the lower surface toward the edges of the upper surface. With this arrangement, it is possible to obtain the same advantageous effects as those of the second embodiment shown in FIG. 5.

In the planar light-emitting device 141 according to the fourteenth embodiment shown in FIG. 28, one of the mutually adjacent peripheral side surfaces 3c of a pair of adjacent lightguide plates 3 is an inclined surface inclined upward and inward from the edges of the lower surface to the edges of the upper surface (the light-exiting surface 3b), the inclined surface facing the direction that the light-exiting surface 3b faces, and the other of the mutually adjacent peripheral side surfaces 3c is an inclined surface inclined upward and outward from the edges of the lower surface to the edges of the upper surface, the inclined surface facing opposite to the direction that the light-exiting surface 3b faces. The peripheral side surfaces 3c of the mutually adjacent lightguide plates 3 are opposed parallel to each other. With this arrangement, it is possible to obtain the same advantageous effects as those of the third embodiment shown in FIG. 6.

FIGS. 29 to 31 show a planar light-emitting device 151 according to a fifteenth embodiment of the present invention. The planar light-emitting device 151 comprises light-emitting units 4 having rectangular lightguide plates 3, respectively, which are aligned in a matrix of 8 vertical rows and 6 horizontal rows, in the same way as the planar light-emitting device 1 according to the first embodiment shown in FIG. 1. The arrows in the figure indicate the direction of light entering the lightguide plates 3. The lightguide plates 3 are secured to the surface of a bezel 5.

As shown in FIGS. 30 and 31, a reflector 155 in the shape of an upward tapered post is disposed between the mutually abutting corners 3g of four mutually adjacent lightguide plates 3 and installed on the reflecting sheet 14. The reflector 155 is molded of a white resin, for example, and has a conical reflecting surface. The reflecting surface of the reflector 155 may be formed by evaporation of silver, for example.

Thus, in the planar light-emitting device 151 of this embodiment, the conical reflector 155 efficiently reflects or diffuses, toward the light-exiting surfaces 3b, the lights exiting from the adjacent lightguide plates 3 to the space between them. Accordingly, it is possible to increase the luminance at the space between the adjacent lightguide plates 3 and to obtain favorable luminance uniformity. Specifically, it is possible to reduce the occurrence of dark spots that would otherwise be likely to appear where the reflectors 155 are provided in this embodiment.

It should be noted that the present invention is not necessarily limited to the foregoing embodiments but can be modified in a variety of ways without departing from the scope of the present invention.

For example, although rectangular or hexagonal lightguide plates are employed in the foregoing embodiments, triangular or other shaped lightguide plates may also be employed.

RGB-LEDs may be employed as the LED light sources to emit light of all colors. For example, an RGB-LED may comprise a combination of a red LED element (R), a green LED element (G) and a blue LED element (B) mounted in one package. Alternatively, LED light sources emitting mutually different colors of light may be provided for each lightguide plate. In these cases, it is possible to illuminate a liquid crystal display panel or the like with various colors of light over the whole planar light-emitting device or for each light-emitting unit by controlling the applied electric current in each LED.

Although LED light sources are employed as light sources in the foregoing embodiments, fluorescent lamps or other types of light sources may also be employed.

Although one diffusing plate and one diffusing sheet are used in the backlight unit in the foregoing embodiments, either of the diffusing plate and the diffusing sheet may be omitted, or at least either of the members may comprise a plurality of the member. The backlight unit may have a diffusing plate or sheet between the prism sheet and the liquid crystal display panel. In other words, the installation position and the number of diff-using plates or sheets used will be properly set by taking into account the haze to correct luminance unevenness.

Although one prism sheet is used in the foregoing embodiments, two prism sheets may be used.

Although the foregoing embodiments employ a diffusing plate, a diffusing sheet and a prism sheet, each having a size corresponding to that of the liquid crystal display panel, these members may each comprise a plurality of split segments that are arranged side by side in the same way as the lightguide plates.

Although one LED light source is installed at a position directly below the center of each lightguide plate in the sixth and seventh embodiments, a plurality of LED light sources may be installed there. Although the lower surface of each lightguide plate is provided with a prism— or other shaped microscopic optical configuration section, the upper surface of the lightguide plate may also be provided with a microscopic optical configuration section to change the optical path of light guided through the lightguide plate by refraction or the like to emit the light upward. For example, the upper surface of the lightguide plate may be provided with a lenticular lens-shaped configuration section as a microscopic optical configuration section, which comprises a plurality of microscopic semicylindrical convex lenses.

It should be noted that the present invention is not necessarily limited to the foregoing embodiment but can be modified in a variety of ways without departing from the gist of the present invention.

The invention claimed is:

1. A planar light-emitting device comprising a plurality of light-emitting units, each light-emitting unit comprising:
    a light source; and
    a lightguide plate having an upper surface as a light-exiting surface, a lower surface opposite to the light-exiting surface, and peripheral side surfaces extending between respective peripheral edges of the upper and lower surfaces, the lightguide plate receiving light from the light source, guiding the received light, and emitting the guided light through the light-exiting surface, at least a part of the peripheral side surface being an inclined surface inclined relative to the light-exiting surface;

the light-emitting units being arranged with the light-exiting surfaces of their respective lightguide plates being substantially flush with each other;

wherein the lightguide plate of each light-emitting unit has a light-entrance surface defined by a part of the peripheral side surfaces;

the light source of each light-emitting unit being adjacently opposed to the light-entrance surface to emit light into the lightguide plate through the light-entrance surface;

at least a part of the peripheral side surfaces other than the light-entrance surface of each light-emitting unit being the inclined surface;

wherein the inclined surface defined by the part of the peripheral side surfaces of the lightguide plate faces in an upward direction relative to the lightguide plate and the inclined surface defined by another part of the peripheral side surfaces faces in a downward direction relative to the lightguide plate; and the upward facing inclined surface of one of mutually adjacent lightguide plates being adjacently opposed to the downward facing inclined surface of an other of the mutually adjacent lightguide plates.

2. The planar light-emitting device of claim 1, wherein an angle of the inclined surface relative to the light-exiting surface is about 45 degrees.

3. A liquid crystal display apparatus comprising:
a liquid crystal display panel; and
the planar light-emitting device of claim 1, which is disposed underneath the liquid crystal display panel.

4. A planar light-emitting device comprising a plurality of light-emitting units, each light-emitting unit comprising:
a light source; and
a lightguide plate having an upper surface as a light-exiting surface, a lower surface opposite to the light-exiting surface, and peripheral side surfaces extending between respective peripheral edges of the upper and lower surfaces, the lightguide plate receiving light from the light source, guiding the received light, and emitting the guided light through the light-exiting surface, at least a part of the peripheral side surface being an inclined surface inclined relative to the light-exiting surface;

the light-emitting units being arranged with the light-exiting surfaces of their respective lightguide plates being substantially flush with each other;

wherein the light source of each light-emitting unit has a light-emitting surface opposed to the lower surface of the lightguide plate;

the lightguide plate receiving light emitted from the light-emitting surface of the light source through the lower surface and emitting the light from the upper surface as the light-exiting surface while propagating the light toward the peripheral side surfaces;

wherein the lightguide plate has on its light-exiting surface a recess tapered toward the lower surface, and a wall surface that defines the recess, wherein the wall surface is configured to direct the light emitted from the light source and received through the lower surface of the lightguide plate toward the peripheral side surfaces of the lightguide plate.

5. The planar light-emitting device of claim 4, wherein the lower surface of the lightguide plate has a microscopic optical configuration section formed on the lightguide plate that directs light guided through the lightguide plate toward the light-exiting surface.

6. The planar light-emitting device of claim 4, wherein the lightguide plate of each light-emitting unit has on its lower surface a recess that houses the light source; and,
the light source is installed in the recess.

7. The planar light-emitting device of claim 4, wherein the lightguide plate has a polygonal shape in plan view.

8. The planar light-emitting device of claim 7, wherein the inclined surface faces in an upward direction relative to the lightguide plate.

9. The planar light-emitting device of claim 8, wherein an angle of the inclined surface relative to the light-exiting surface is about 45 degrees.

10. The planar light-emitting device of claim 7, wherein the inclined surface faces in a downward direction relative to the lightguide plate.

11. The planar light-emitting device of claim 7 further comprising:
a reflector situated between mutually adjacent lightguide plates, wherein light emitted from the light-exiting surface of the lightguide plate and arrived at the reflector is deflected upward by the reflector, the reflector being situated between mutually closely disposed corners of at least three mutually adjacent lightguide plates.

12. The planar light-emitting device of claim 11, wherein the reflector is in a shape of an upward tapered post.

13. The planar light-emitting device of claim 12, further comprising:
a diffusing plate provided over the lightguide plate at a distance from it, the diffusing plate being supported by the reflector.

14. The planar light-emitting device of claim 7, wherein the polygonal shape that the lightguide plate in plan view has is a hexagonal shape.

15. A liquid crystal display apparatus comprising:
a liquid crystal display panel; and
the planar light-emitting device of claim 4, which is disposed underneath the liquid crystal display panel.

16. A planar light-emitting device comprising a plurality of light-emitting units, each light-emitting unit comprising:
a light source; and
a lightguide plate having an upper surface as a light-exiting surface, a lower surface opposite to the light-exiting surface, and peripheral side surfaces extending between respective peripheral edges of the upper and lower surfaces, the lightguide plate receiving light from the light source, guiding the received light, and emitting the guided light through the light-exiting surface, at least a part of the peripheral side surface being an inclined surface inclined relative to the light-exiting surface;

the light-emitting units being arranged with the light-exiting surfaces of their respective lightguide plates being substantially flush with each other;

wherein the lightguide plate of each light-emitting unit has a light-entrance surface defined by a part of the peripheral side surfaces;

the light source of each light-emitting unit being adjacently opposed to the light-entrance surface to emit light into the lightguide plate through the light-entrance surface;

at least a part of the peripheral side surfaces other than the light-entrance surface of each light-emitting unit being the inclined surface;

wherein the lightguide plate of each light-emitting unit has a polygonal shape in a top plan view and has the light-entrance surface disposed at at least one of corners of the peripheral side surfaces of the polygonal light-guide plate;

the light source being set with its light-emitting surface is opposed to the light-entrance surface;

wherein the lightguide plates are rectangular in shape and arranged in a matrix of a plurality of vertical rows and a plurality of horizontal rows; and wherein only one of mutually adjacent four corners abutting each other in mutually adjacent four lightguide plates is configured to have the light-entrance surface.

17. The planar light-emitting device of claim 16, wherein the light-entrance surfaces of the lightguide plates in one of mutually adjacent rows are directed in a direction opposite to a direction in which the light-entrance surface of the lightguide plates in an other of the mutually adjacent rows.

18. The planar light-emitting device of claim 16, wherein the at least one of the corners of the lightguide plate of each light-emitting unit has a recess that houses the light source.

19. The planar light-emitting device of claim 18, wherein the light source is mounted on a mounting substrate;

the lightguide plate of each light-emitting unit having a substrate-fitting groove adjacent to the recess in the at least one of its corners;

the light source of each light-emitting unit being disposed in the recess by inserting the mounting substrate into the substrate-fitting groove.

20. A liquid crystal display apparatus comprising:

a liquid crystal display panel; and the planar light-emitting device of claim 16, which is disposed underneath the liquid crystal display panel.

* * * * *